US010546561B2

(12) United States Patent
Kusanagi et al.

(10) Patent No.: US 10,546,561 B2
(45) Date of Patent: Jan. 28, 2020

(54) DISPLAY DEVICE, MOBILE DEVICE, DISPLAY METHOD, AND RECORDING MEDIUM

(71) Applicant: Ricoh Company, Ltd., Tokyo (JP)

(72) Inventors: Masato Kusanagi, Kanagawa (JP); Yuuki Suzuki, Kanagawa (JP); Hiroshi Yamaguchi, Kanagawa (JP); Keita Katagiri, Kanagawa (JP); Kenichiroh Saisho, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/879,857

(22) Filed: Jan. 25, 2018

(65) Prior Publication Data
US 2018/0218713 A1    Aug. 2, 2018

(30) Foreign Application Priority Data
Feb. 2, 2017  (JP) .................. 2017-017217

(51) Int. Cl.
  *G09G 5/38* (2006.01)
  *B60K 35/00* (2006.01)
  *G06T 11/60* (2006.01)
  *B60R 1/00* (2006.01)
  (Continued)

(52) U.S. Cl.
  CPC ............... *G09G 5/38* (2013.01); *B60K 35/00* (2013.01); *B60Q 9/008* (2013.01); *G06T 11/60* (2013.01); *B60K 2370/18* (2019.05); *B60K 2370/334* (2019.05); *B60R 1/00* (2013.01); *B60R 2300/205* (2013.01); *B60R 2300/308* (2013.01); *G09G 3/001* (2013.01); *G09G 2340/0471* (2013.01); *G09G 2340/0478* (2013.01); *G09G 2340/12* (2013.01); *G09G 2380/10* (2013.01)

(58) Field of Classification Search
  CPC .............. G06T 19/006; G06K 9/00805; G06K 9/00798; G09G 2354/00; G09G 3/002; G09G 2380/10; G08G 1/166; G08G 1/167; G02B 27/01; B60K 2350/2052; B60R 2300/205; B60R 2300/308; B60R 2300/8093
  See application file for complete search history.

(56) References Cited

U.S. PATENT DOCUMENTS

| | | | |
|---|---|---|---|
| 2008/0195315 A1* | 8/2008 | Hu ...................... | G01C 1/3647 701/455 |
| 2009/0179916 A1* | 7/2009 | Williams ................. | G06T 7/80 345/629 |

(Continued)

FOREIGN PATENT DOCUMENTS

| | | |
|---|---|---|
| JP | 2013-216315 | 10/2013 |
| JP | 2016-107945 | 6/2016 |

*Primary Examiner* — Chante E Harrison
(74) *Attorney, Agent, or Firm* — XSENSUS LLP

(57) ABSTRACT

A display device mountable on a mobile object includes an image forming unit to form an image with light and a light guide to guide the light forming the image to a transmission and reflection member to cause a virtual image of the image be display within a display area. The virtual image overlaps an object outside the mobile object. The image is formed such that a vanishing point of the virtual image being displayed is displaced from a vanishing point of the object.

18 Claims, 25 Drawing Sheets

(51) Int. Cl.
  *B60Q 9/00*    (2006.01)
  *G09G 3/00*    (2006.01)

(56) References Cited

U.S. PATENT DOCUMENTS

| | | | |
|---|---|---|---|
| 2012/0170130 A1* | 7/2012 | Sasaki | B60K 35/00 |
| | | | 359/630 |
| 2012/0259546 A1* | 10/2012 | Kim | G02B 27/01 |
| | | | 701/527 |
| 2014/0092237 A1* | 4/2014 | Watanabe | B60R 1/00 |
| | | | 348/118 |
| 2014/0161323 A1* | 6/2014 | Livyatan | G06T 3/0093 |
| | | | 382/107 |
| 2014/0177022 A1 | 6/2014 | Saisho et al. | |
| 2015/0277115 A1 | 10/2015 | Inamoto et al. | |
| 2015/0370069 A1 | 12/2015 | Saisho et al. | |
| 2016/0170487 A1 | 6/2016 | Saisho | |
| 2016/0313562 A1 | 10/2016 | Saisho et al. | |
| 2016/0334637 A1 | 11/2016 | Saisho et al. | |
| 2017/0140227 A1* | 5/2017 | Takemura | G08G 1/16 |
| 2017/0154554 A1* | 6/2017 | Tanaka | G06K 9/00798 |
| 2017/0155867 A1 | 6/2017 | Yokota et al. | |
| 2017/0161009 A1* | 6/2017 | Ogisu | B60K 35/00 |
| 2017/0305345 A1* | 10/2017 | Hashimoto | B60R 1/00 |
| 2017/0315353 A1 | 11/2017 | Saisho et al. | |
| 2017/0336222 A1 | 11/2017 | Yamaguchi et al. | |
| 2017/0336629 A1 | 11/2017 | Suzuki et al. | |
| 2018/0046867 A1* | 2/2018 | Yang | B60R 1/00 |
| 2018/0082132 A1* | 3/2018 | Spampinato | G06K 9/00335 |
| 2018/0157036 A1* | 6/2018 | Choi | G02B 27/0101 |
| 2018/0178839 A1* | 6/2018 | Ide | B62D 15/025 |
| 2018/0350236 A1* | 12/2018 | Yamaguchi | B60R 16/02 |
| 2018/0361917 A1* | 12/2018 | Kim | G03B 21/206 |
| 2018/0365859 A1* | 12/2018 | Oba | H04N 5/232 |
| 2018/0373942 A1* | 12/2018 | Noda | G06K 9/00805 |
| 2019/0005726 A1* | 1/2019 | Nakano | G06T 19/006 |
| 2019/0005727 A1* | 1/2019 | Tanaka | G06T 19/006 |
| 2019/0026557 A1* | 1/2019 | Watanabe | G06T 17/20 |
| 2019/0071075 A1* | 3/2019 | Mimura | B60R 21/00 |

* cited by examiner

DISPLAY DEVICE, MOBILE DEVICE, DISPLAY METHOD, AND RECORDING MEDIUM

CROSS-REFERENCE TO RELATED APPLICATION

This patent application is based on and claims priority pursuant to 35 U.S.C. § 119(a) to Japanese Patent Application No. 2017-017217, filed on Feb. 2, 2017 in the Japan Patent Office, the entire disclosure of which is hereby incorporated by reference herein.

BACKGROUND

Technical Field

Embodiments of the present disclosure relate to a display device, a mobile device, a display method, and a recording medium.

Background

An apparatus is known that illuminates a transmission and reflection member disposed in a mobile object with light forming an image to display a virtual image within a display area such that the virtual image overlaps an object outside the mobile object.

However, such an apparatus has room for improvement in preventing or reducing the uncomfortable feeling of a viewer that visually recognizes the object and the virtual image at the same time.

SUMMARY

In one aspect of this disclosure, there is provided an improved display device mountable on a mobile object including an image forming unit to form an image with light and a light guide to guide the light forming the image to a transmission and reflection member to cause a virtual image of the image be displayed within a display area. The virtual image overlaps an object outside the mobile object. The image is formed such that a vanishing point of the virtual image being displayed is displaced from a vanishing point of the object In another aspect of this disclosure, there is provided an improved display method performed by a display device mountable on a mobile object including forming an image with light; and guiding the light forming the image to a transmission and reflection member mounted on the mobile object to cause a virtual image of the image be displayed within a display area, the virtual image overlapping an object outside the mobile object. In the forming, the image is formed such that a vanishing point of the virtual image being displayed is displaced from a vanishing point of the object.

In still another aspect of this disclosure, there is provided an improved non-transitory recording medium storing a program for causing a computer to execute such a method.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
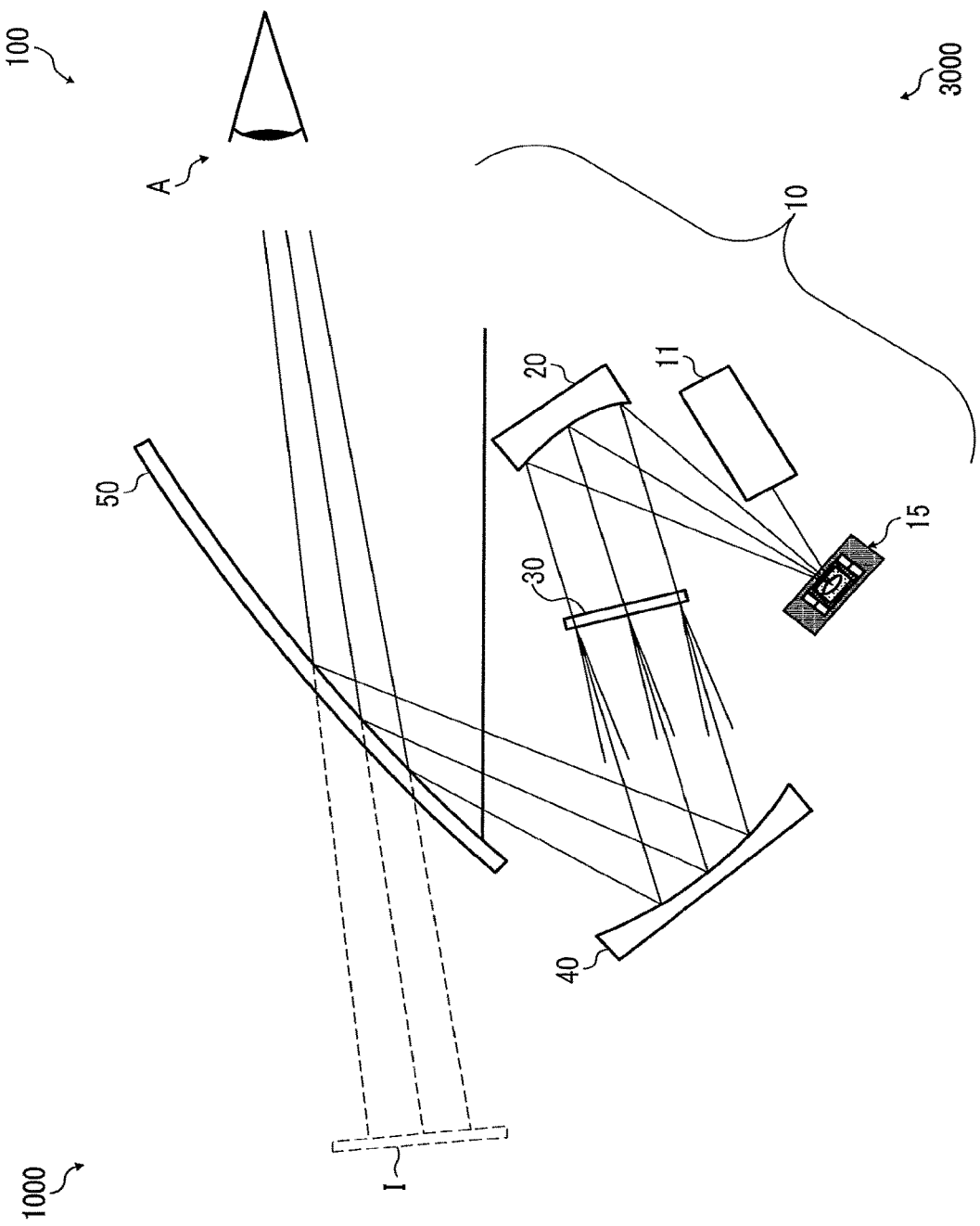
FIG. 1 is an illustration of a schematic configuration of a heads-up display (HUD) according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

Outline

A description is given of a heads-up display (HUD) 100 according to an embodiment of the present disclosure, referring to the figures.

FIG. 1 is an illustration of a schematic configuration of the HUD 100 according to the present embodiment.

Schematic Configuration of HUD

As an HUD projection method, there is a panel system and a laser scanning system. In the panel system, an imaging device, such as a liquid crystal display (LCD), a digital micro-mirror device (DMD) panel (digital mirror device panel), or a vacuum fluorescent display (VFD) is used to form an intermediate image. In the laser scanning method, a two-dimensional scanning device scans an object with a laser beam emitted from a laser beam source to form an intermediate image. In particular, in the latter laser scan type, unlike the panel type where the image is formed by partial light blocking over the entire screen emission, since emission can be controlled on a pixel-by-pixel basis, in general, a high-contrast image can be formed.

In view of the above, the HUD 100 according to the present embodiment adopts the laser scanning system. In some embodiments, the HUD 100 according to the present embodiment may adopt the above-described panel system as the projection system.

The HUD 100 is mounted, for example, on a mobile object such as a vehicle, and makes navigation information used for operating the vehicle (for example, speed of the vehicle, course information, distance to a destination, name of current place, the presence and position of an object (target) ahead of the vehicle, signs, such as speed limit, and traffic congestion information) visible through a front windshield 50 (see FIG. 1) of the vehicle. In such a case, the front windshield 50 also serves as a transmission and reflection member that transmits a portion of the incident light and reflects at least some of the remaining incident light. In the following description, cases in which the HUD 100 is mounted on a vehicle having the front windshield 50 are described.

As illustrated in FIG. 1, the HUD 100 includes an optical scanning device 10, a screen 30, and a concave mirror 40. The optical scanning device 10 includes a light-source unit 11, which is also referred to as a light source, a light deflector 15, and a scanning mirror 20. The HUD 100 emits light (image light) for forming an image on the front windshield 50, to allow a viewer A (in the present embodiment, a driver as a passenger position of a vehicle) to visually identify a virtual image I at eye-level. In other words, the viewer A can visually identify, through the front windshield 50, an image (intermediate image) as the virtual image formed (drawn) on the screen 30 by the optical scanning device 10.

The HUD 100 is disposed under the dashboard of the vehicle, as an example. The distance from the location of the eye of the viewer A to the front windshield 50 ranges from several tens of centimeters (cm) to approximately 1 meter (m).

In the present embodiment, the concave mirror 40 is designed by using a commercially available optical-designed simulation software such that the concave mirror 40 obtains a predetermined level of light-gathering power to achieve a desired image-forming position of the virtual image I.

In the HUD 100, the light-gathering power of the concave mirror 40 is designed such that the virtual image I is displayed at a position (in depth) with 1 m or more and 30 m or less (preferably 10 m or less) away from the eye of the viewer A.

The front windshield 50 typically has a slightly curved surface, and is not a flat plane. The curved surfaces of the concave mirror 40 and the front windshield 50 determine the image-forming position of the virtual image I.

The light-source unit 11 combines laser beams of three colors R (red), G (green), and B (blue) modulated according to image data. The combined light, in which the three-color laser beams are combined, is guided to the reflection plane of the light deflector 15. The light deflector 15 as a deflector is a micro-electromechanical system (MEMS) scanner produced by, e.g., a semiconductor manufacturing process. The light deflector 15 includes a single micro-mirror that is independently rotatable about two perpendicular axes. The light-source unit 11 and the light deflector 15 are described later in detail.

The light (the above-described combined light) according to image data output from the light-source unit 11 is deflected by the light deflector 15 and reflected by the scanning mirror 20. Thus, the light is directed to the screen 30. Then, the screen 30 is optically scanned to form an intermediate image thereon. The light deflector 15 and the scanning mirror 20 constitute an optical scanning system. Note that, in at least one embodiment, the concave mirror 40 is designed and disposed to correct the optical deformation in which the horizon of the intermediate image is distorted convexly upward or downward due to the shape of the front windshield 50.

The light having passed through the screen 30 is reflected by the concave mirror 40 toward the front windshield 50. Some of light rays that enter the front windshield 50 permeate the front windshield 50, and at least some of the remaining light rays are reflected by the front windshield 50 toward the viewpoint position of a viewer A. As a result, the viewer A can visually identify, through the front windshield 50, a virtual image I that is an enlarged intermediate image. That is, the viewer A can see an enlarged virtual image I through the front windshield 50.

In some embodiments, a combiner as the transmission and reflection member may be disposed closer to the viewpoint position of the viewer A than the front windshield 50 to receive light from the concave mirror 40, which allows displaying a virtual image in the same manner as in the configuration with only the front windshield 50 disposed.

Hardware Configuration of Control System of the HUD

Figure 2:
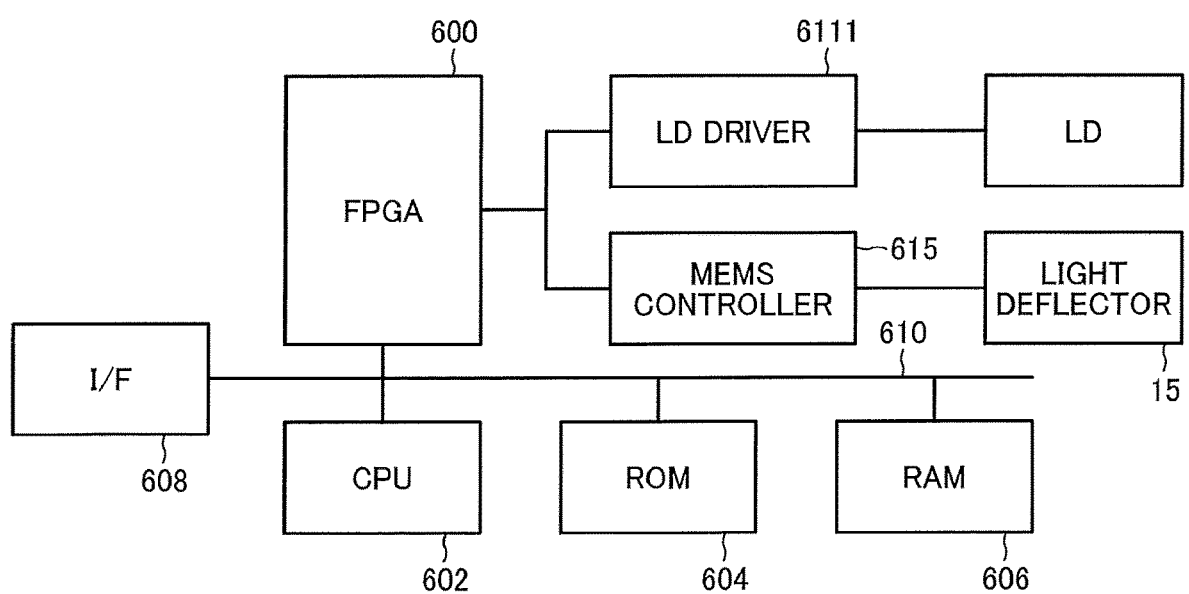
FIG. 2 is a block diagram of a hardware configuration of a control system of the HUD.

FIG. 2 is a block diagram of a hardware configuration of a control system of the HUD 100. As illustrated in FIG. 2, the HUD 100 includes an field programmable gate array (FPGA) 600, a central processing unit (CPU) 602, a read-only memory (ROM) 604, a random access memory (RAM) 606, an interface (IF) 608, a bus line 610, a laser diode (LD) driver 6111, and a micro-electromechanical systems (MEMS) controller 615.

The FPGA 600 causes the LD driver 6111 to drive an LD described below, and causes the MEMS controller 615 to control the light deflector 15 according to image data. The CPU 602 controls each operation of the HUD 100. The ROM 604 stores an image processing program that is executed by the CPU 602 to control operation of the HUD 100. The RAM 606 is used as a working area in which the CPU 602 executes the program. The IF 608 is an interface to communicate with an external controller such as a controller area network (CAN) of a vehicle.

Functional Blocks of the HUD Device

Figure 3:
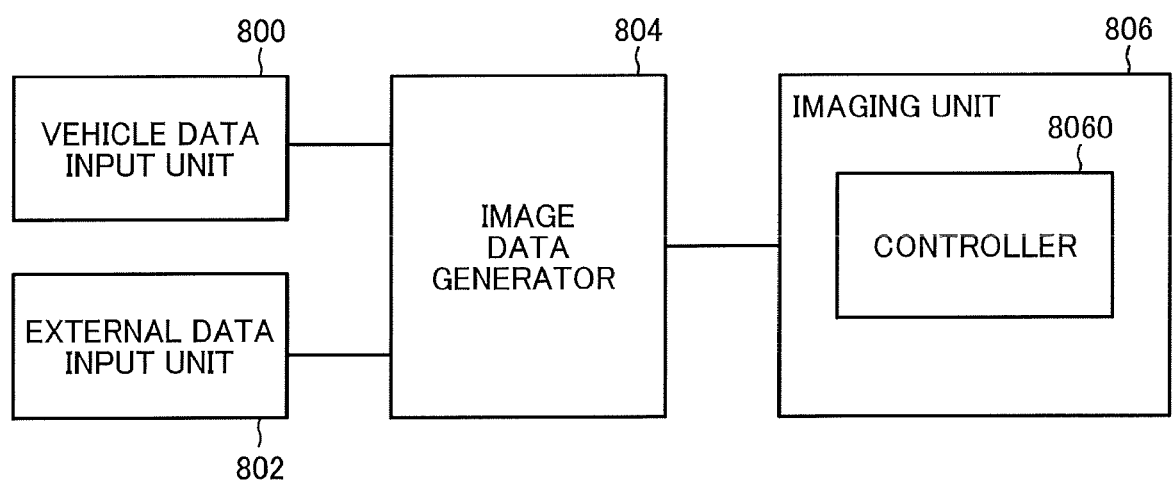
FIG. 3 is a functional block diagram of the HUD according to an embodiment of the present disclosure.

FIG. 3 is a block diagram of the HUD 100. As illustrated in FIG. 3, the HUD 100 includes a vehicle data input unit 800, an external data input unit 802, an image data generator 804, and an imaging unit 806. The vehicle data input unit 800 receives vehicle-related data, such as the speed of the vehicle, the travel distance, the position of an object, and the exterior brightness, from the CAN. The external data input unit 802 receives external data, such as navigation information from a global positioning system (GPS) mounted on a vehicle, from the external network. The image data generator 804 generates image data of an image to be drawn according to the data input from the vehicle data input unit 800 and the external data input unit 802, and sends the generated image data to an imaging unit 806. The imaging unit 806 includes a control unit 8060 to draw an image according to the image data received. The image data generator 804 and the control unit 8060 are implemented by the FPGA 600. The imaging unit 806 is implemented by the FPGA 600, the LD driver 6111, the MEMS controller 615, the optical scanning device 10, the screen 30, and the concave mirror 40.

Configuration of Light-Source Unit

Figure 4:
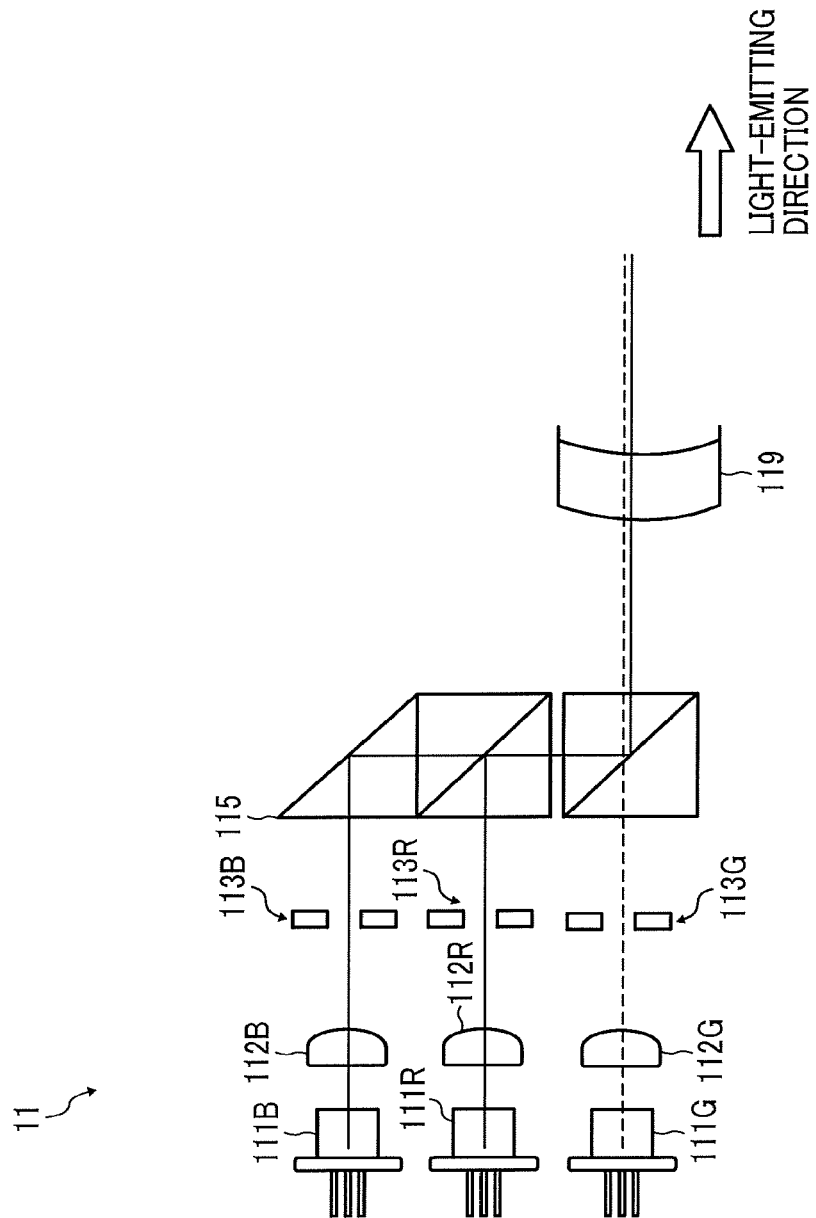
FIG. 4 is an illustration of a light-source unit of the HUD according to an embodiment of the present disclosure.

FIG. 4 is an illustration of a configuration of the light-source unit 11. As illustrated in FIG. 4, the light-source unit 11 includes a plurality of light-emitting elements 111R, 111B, and 111G each having a single or a plurality of (for example, three light-emitting points in the present embodiment) light-emitting points. Each of the light-emitting elements 111R, 111B, and 111G is laser diode (LD). The light-emitting elements 111R, 111B, and 111G emit light beams having different wavelengths $\lambda R$, $\lambda G$, and $\lambda B$, respectively. For example, the wavelength $\lambda R$ is 640 nanometer (nm), the wavelength $\lambda G$ is 530 nm, and $\lambda B$ is 445 nm. Laser beams $\lambda R$, $\lambda G$, and $\lambda B$ emitted from the light-emitting elements (LD) 111R, 111G, and 111B pass through the respective coupling lenses 112R, 112G, and 112B to be coupled to a subsequent optical system. The coupled laser beams are shaped by aperture members 113R, 113G, and 113B corresponding to the respective laser beams. The aperture members 113R, 113G, and 113B may have any shape, such as a circle, an ellipse, a rectangle, or a square, according to the divergence angle of the laser beam. The laser beams shaped by the corresponding aperture members 113R, 113G, and 113B pass through a combining element 115 to be combined into one laser beam that travels along one optical path. The combining element 115 is a plate or prismatic dichroic mirror to reflect or transmit each of the laser beams therethrough according to the wavelength of each of the laser beams and thus combine the laser beams into one laser beam that travels along one optical path. The combined laser beam passes through a lens 119 to be guided to the reflection plane of the light deflector 15. The lens 119 is a meniscus lens having a concave surface facing the light deflector 15.

Configuration of Light Deflector

Figure 5:
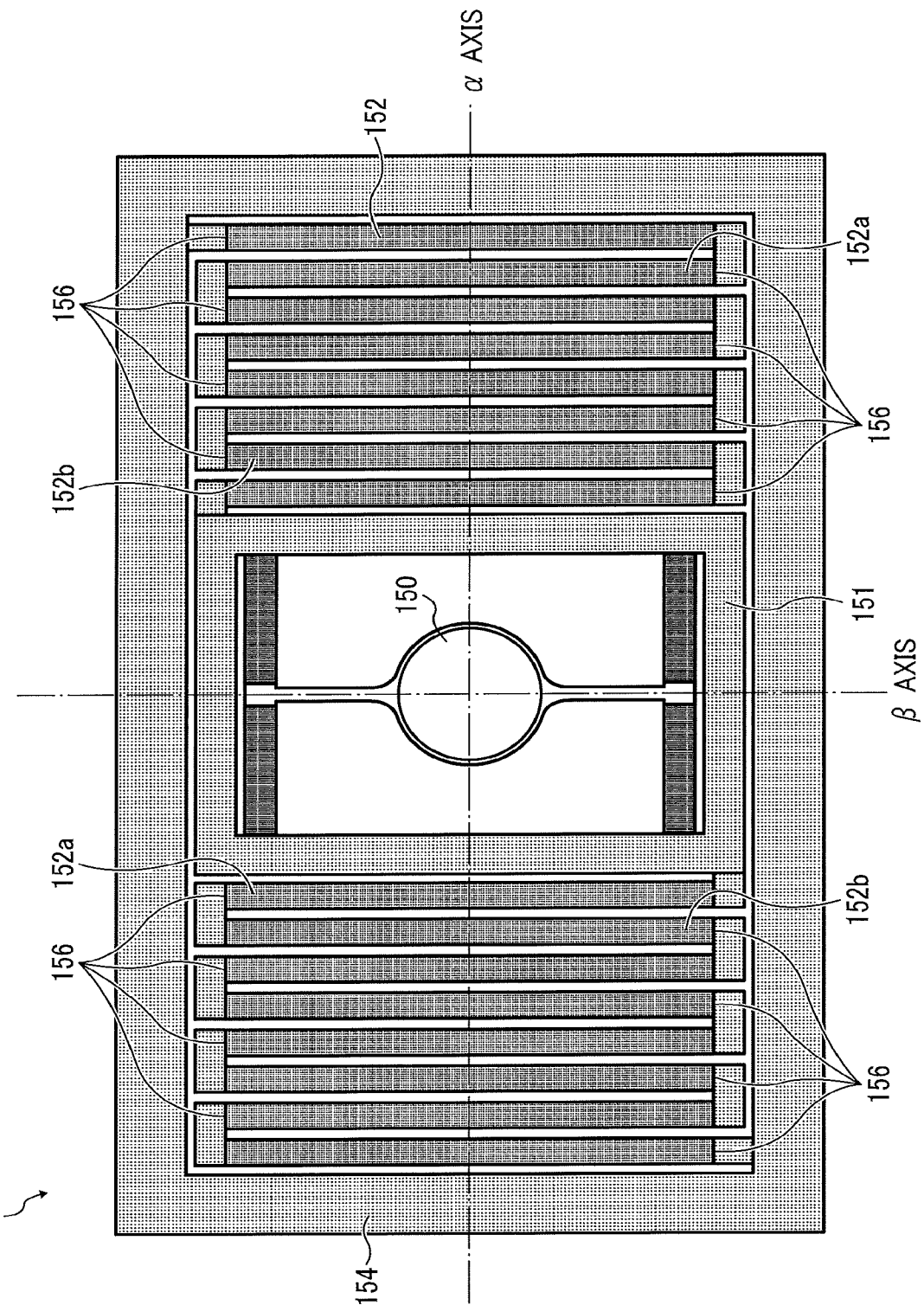
FIG. 5 is an illustration of a light deflector of the HUD according to an embodiment of the present disclosure.

FIG. 5 is an illustration of a configuration of the light deflector 15. As illustrated in FIG. 5, the light deflector 15, which is a two-axis MEMS scanner produced by a semiconductor manufacturing process, includes a mirror 150 having a reflection plane and a plurality of bars arranged in an $\alpha$-axis direction. The light deflector 15 further includes a pair of serpentine units 152 in which two adjacent beams are connected to form a meander. The two adjacent beams of each serpentine unit 152 are a first beam 152a and a second beam 152b. The first beam 152a and the second beam 152b are supported by a frame member 154. Each of the first beam 152a and the second beam 152b is provided with a plurality of piezoelectric materials 156 (for example, PZT (lead zirconate titanate)). Different voltages are applied to the piezoelectric member of the two adjacent beams in each serpentine unit 152. Accordingly, the two adjacent beams 152a and 152b bend in different directions. As elastic energy is accumulated in the bent portion, the mirror 150 rotates about the $\alpha$ axis (in the vertical direction) with a wide angle. Due to such a configuration, optical scanning where the vertical axis is the center of the $\alpha$ axis can be performed in the vertical direction with lower voltage. On the other hand, around the $\beta$ axis in the horizontal direction, the optical scanning with resonance is performed using, for example, a torsion bar that is connected to the mirror 150.

Although the HUD 100 momentarily projects a dot image corresponding to a laser beam diameter, an afterimage within one frame image sufficiently remains in a human eye because of very-high-speed scanning. Such an afterimage phenomenon allows an identifier to perceive the afterimage as an image projected onto an "image display area". In actuality, the image having been displayed on the screen 30 is reflected by the concave mirror 40 and the front windshield 50 and the image is perceived as a virtual image by an identifier in the image display area. In such a mechanism, the light emission of the LD may be stopped when no image is displayed. In other words, the luminance can be substantially set to 0 for any place other than the place in which a virtual image is displayed in the image display area.

More specifically, the image-forming position of a virtual image formed by the HUD 100 is any position within the image display area in which the virtual image can be formed. Such an image display area is determined according to the design specifications for the HUD.

As described above, the laser scanning system is adopted in the present embodiment. This allows switching off the LD or reducing the amount of light of the LD for portions not to be displayed (hidden).

In the panel system, in which an intermediate image is expressed by the imaging device, such as a liquid crystal display (LCD) and a digital micro-mirror device (DMD), completely hiding the images is difficult even in a black display mode due to the properties of the LCD and the DMD in which the entire panel is illuminated. This causes misadjusted black level. However, the laser scanning system can prevent such a misadjusted black level (black floating).

Figure 6:
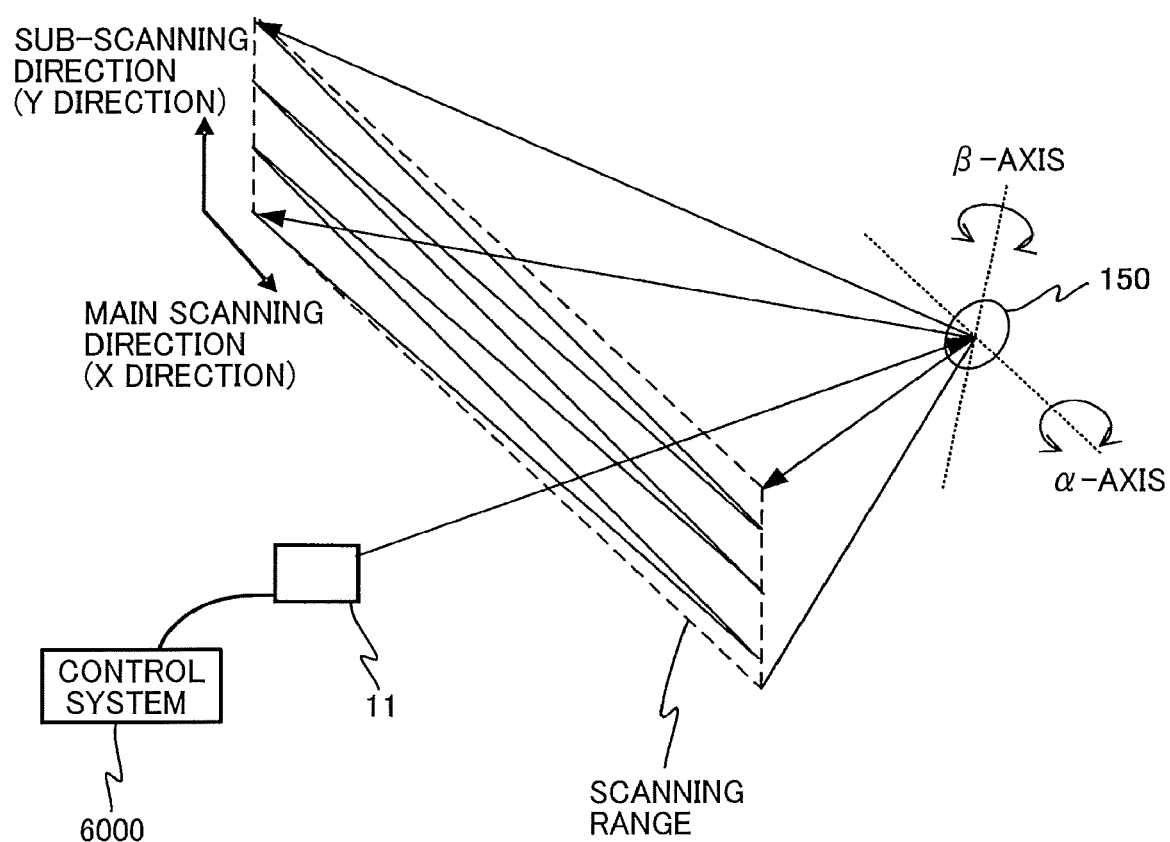
FIG. 6 is an illustration of the corresponding relation between a mirror of the light deflector and the scanning range.

Note that, the FPGA 600 controls the light-emission intensity, timing of light emission, and received-light waveform of each of the light-emitting elements 111R, 111B, and 111G in the light-source unit 11. The LD driver 6111 drives each of the light-emitting elements 111R, 111B, and 111G to emit light. As illustrated in FIG. 6, the light beam, which has been emitted from each of the light-emitting elements 111R, 111B, and 111G and combined to travel along one optical path, is two-dimensionally deflected by the light deflector 15 around the α axis and the β axis. The deflected light beam is reflected by the scanning mirror 20 (see FIG. 1), and the reflected light beam as scanning light scans the screen 30. That is, the scanning light two-dimensionally scans the screen 30.

The scanning light scans (two-way scans) a scanning range of the screen 30 in a vibrating manner along the main scanning direction at a high frequency of approximately from 20,000 to 40,000 hertz (Hz), and one-way scans the scanning range in the sub-scanning direction at a low frequency of approximately a few tens of Hz. That is, the optical scanning system performs a raster scan. In so doing, controlling light emission of each light-emitting element (111B, 111R, and 111G) according to a scanning position (the position of the scanning light) allows writing an image and displaying a virtual image for each pixel.

The length of time to write an image in one frame, that is, the length of time for scanning one frame (one cycle of two-dimensional scanning), is a few tens of millisecond (msec), determined by the above-described frequency of a few tens of Hz for the sub-scanning direction (sub-scanning frequency). For example, with a frequency of 20,000 Hz for the main-scanning direction (main-scanning frequency) and a sub-scanning frequency of 50 Hz, scanning for one frame takes 20 msec.

Figure 7:
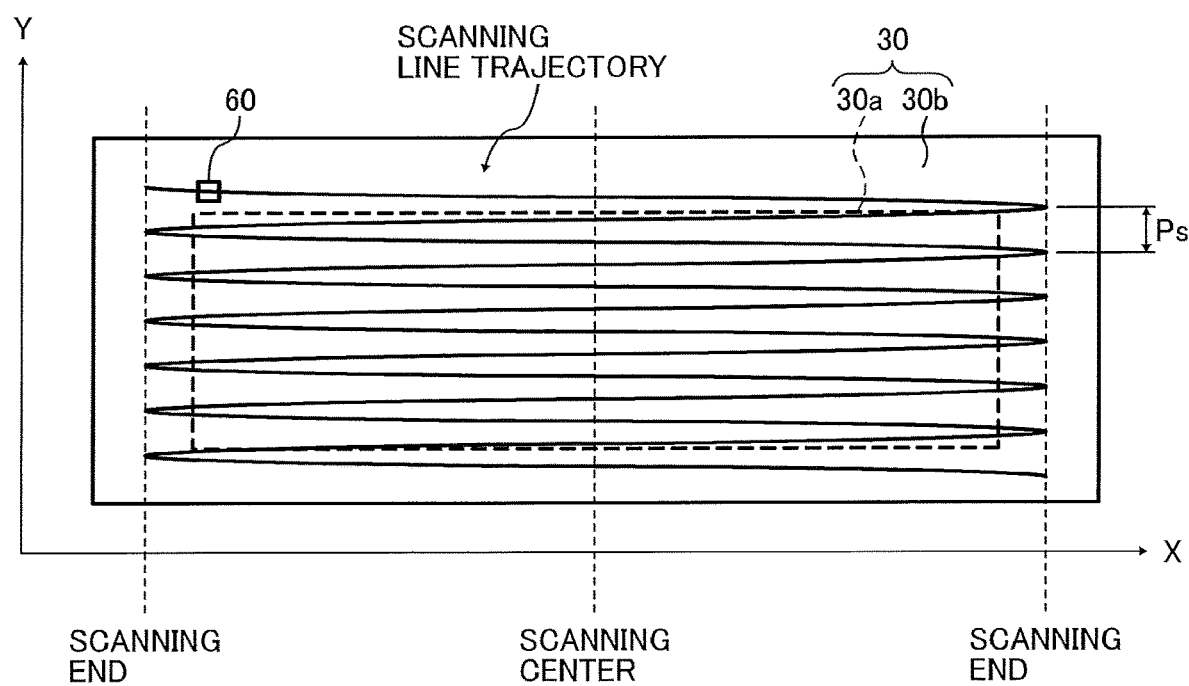
FIG. 7 is an illustration of an example of a trajectory of a scanning line when two-dimensional scanning is performed, according to an embodiment of the present disclosure.

As illustrated in FIG. 7, the screen 30 includes an image area 30a (effective scanning area) in which images are written (illuminated with modulated light according to image data). The screen 30 further includes a marginal area 30b that surrounds the image area.

In the present embodiment, the entire area to be scanned by the light deflector 15 is referred to as a "scanning range". In the present embodiment, the scanning range is the combination of the image area 30a and a part of the marginal area 30b (portion near the periphery of the image area 30a). In FIG. 7, the trajectory of the scanning line in the scanning range is indicated by a zigzag line. The number of scanning lines shown in FIG. 7 is less than the actual number for the sake of simplification.

The image area 30a of the screen 30 includes a transmissive element, such as a microlens array, that exhibits a light diffusion effect. In the present embodiment, the image area 30a is rectangular and planar as illustrated in FIG. 7. However, no limitation is intended thereby. In some embodiments, the image area 30a may be polygon or curved. Alternatively, in some embodiments, the screen 30 may be a flat plate or curved plate that is incapable of diffusing light. Further, in some embodiments, the image area 30a is a reflective element such as a micromirror array that exhibits a light diffusion effect, according to the design of the HUD 100.

Figure 8A:
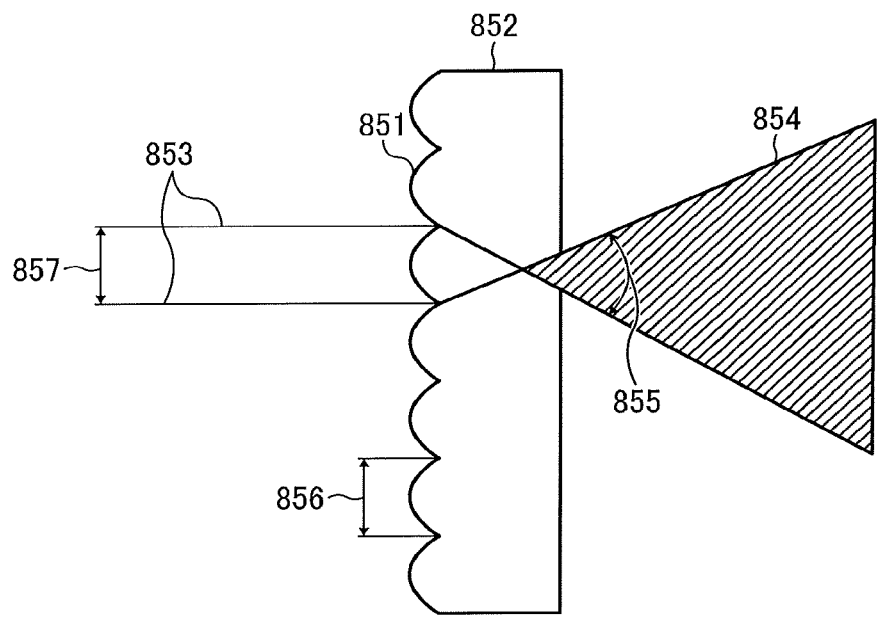
FIGS. 8A and 8B are an illustration for describing a difference in operation due to differences in sizes of a laser-beam diameter and a lens diameter in a microlens array.
Figure 8B:
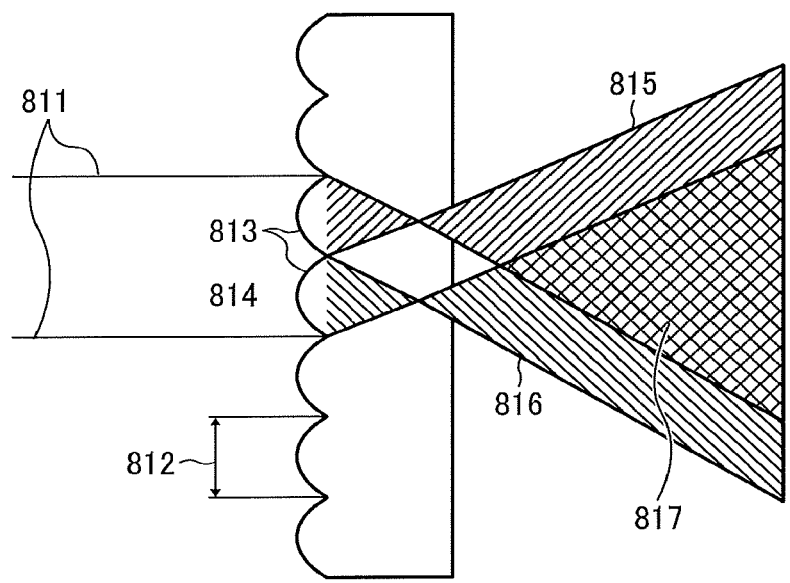

The following describes diffusion and coherent noise that occurs in a microlens array used in the image area 30a of the screen 30 referring to FIGS. 8A and 8B.

FIG. 8A illustrates a microlens array 852. The microlens array 852 has a micro-convex lens structure in which micro-convex lenses 851 are arranged. A laser-beam diameter 857 of a pixel displaying beam 853 is smaller than a size 856 of each micro-convex lens 851. In other words, the size 856 of each micro-convex lens 851 is larger than the laser-beam diameter 857. Note that, the pixel displaying beam 853 according to the present embodiment is a laser beam and has a light intensity distribution of a Gaussian distribution around the center of the laser beam. Accordingly, the laser-beam diameter 857 is a distance in the radial direction of a laser beam where the light intensity in the light intensity distribution decreases to "1/e2".

In FIG. 8A, the laser-beam diameter 857 is drawn to have a size equal to the size 856 of each micro-convex lens 851. However, in some embodiments, the laser-beam diameter 857 may not be equal to the size 856 of the micro-convex lens 851. The light-beam bundle diameter 857 is satisfactory as long as its size does not exceed the size 856 of each micro-convex lens 851.

In FIG. 8A, the entire pixel displaying beam 853 is incident on one micro-convex lens 851 and is converted to a diffused laser beam 854 having a divergence angle 855. Note that the "divergence angle" may be referred to as a "diffusion angle" in some cases.

In FIG. 8A, one laser beam is diffused (the diffused laser beam 854) without any interfering laser beam, and thus no coherent noise occurs. Note that the size of the divergence angle 855 may be set by adjusting the shape of the micro-convex lens 851 as appropriate.

In FIG. 8B, the laser-beam diameter of the pixel displaying beam 811 is twice the array pitch 812 of the micro-convex lenses, and the pixel displaying beam 811 enters both micro-convex lenses 813 and 814. In this case, the pixel displaying beam 811 passes through the two micro-convex lenses 813 and 814, thereby separating into two laser beams 815 and 816 each of which diverges. The two laser beams 815 and 816 overlap each other in an area 817 to interfere with each other therein, so that coherent noise occurs.

Referring to FIG. 7, a synchronous detection system 60 including light-receiving elements is disposed outside (the part of the marginal area 30b) the image area 30a in the scanning range. In the present embodiment, the synchronous detection system 60 is disposed on the +Y side of the corner of −X side and +Y side of the image area 30a. Hereinafter, the main-scanning direction of the screen 30 is referred to as the X direction, and the sub-scanning direction of the screen 30 is referred to as the Y direction.

The synchronous detection system 60 detects the operation of the light deflector 15 and outputs, to the FPGA 600, a synchronization signal to determine the timing of starting scanning and the timing of terminating scanning.

Details

A driver causes the host vehicle to travel with the lane of the road surface on which the host vehicle is traveling. Accordingly, when a virtual image of a shape far from the shape of the lane is displayed in the field of view, the driver who views the lane and the virtual image at the same time feels uncomfortable, which might cause an erroneous driving operation, resulting in a dangerous situation such as an accident.

To avoid such circumstances, the shapes of the virtual image and the lane are approximated, to prevent or reduce the uncomfortable feelings of the driver.

Figure 9:
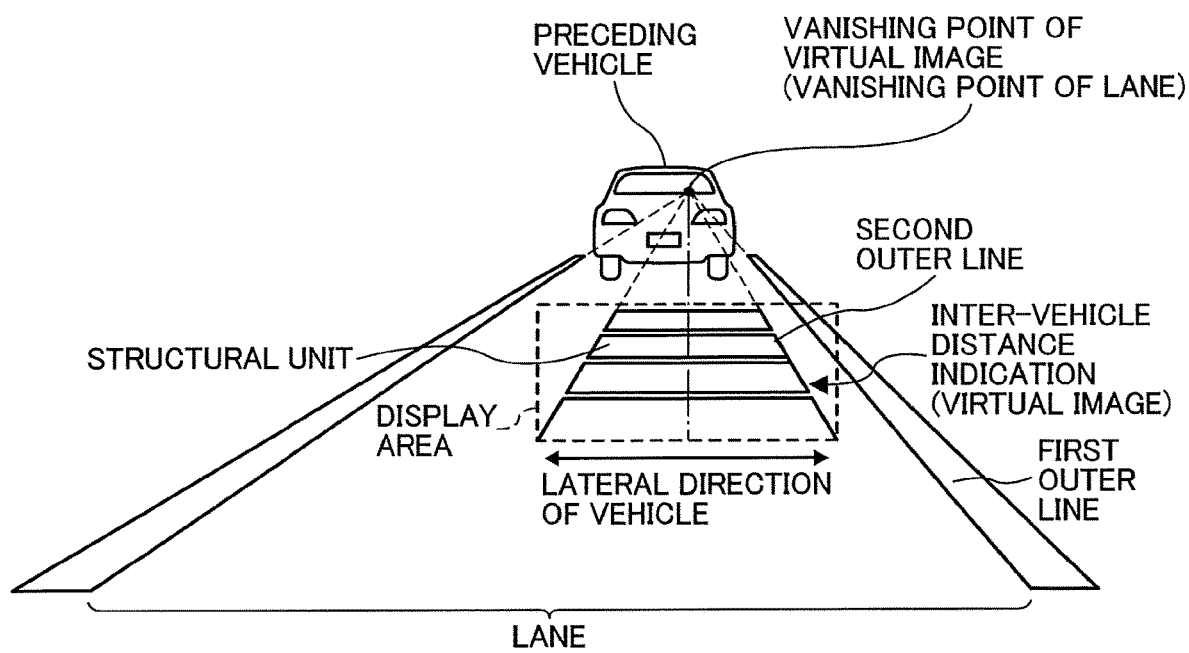
FIG. 9 is an illustration of a comparative example in which the vanishing point of a virtual image coincides with the vanishing point of the lane.

As a specific example of an approximating method, the vanishing point of the virtual image is made to coincide with the vanishing point of the lane when viewed from the driver (the viewer sitting at the driver's seat) as illustrated in a comparative example of FIG. 9. FIG. 9 is an illustration of a preceding vehicle of the host vehicle and a forward view of the driver seated in the driver's seat of a vehicle (the host vehicle) with the right-side steering wheel traveling in the same lane as that of the preceding vehicle. In the present disclosure, the "vanishing point of the virtual image" refers to the point of intersection of two left and right outer lines or intersection of the extension lines of the two left and right outer lines of a figure (for example, a trapezoid or a triangle) constituting the virtual image displayed in the display area.

Further, the "vanishing point of the lane" refers to the point at which the left and right outer lines that defines the lane eventually intersect with each other in the depth direction as seen from the driver (the viewer seated in the driver's seat).

In FIG. 9, an inter-vehicle distance indication that represents a distance between the host vehicle with the right-side steering wheel and the preceding vehicle is displayed as a virtual image within the display area, overlapping the lane between the host vehicle and the preceding vehicle. This inter-vehicle distance indication is an indication in a shape of a trapezoid that increases in width in a direction to the host vehicle as a whole, including a plurality of structural units arranged in the longitudinal direction of the lane. Each of the structural units has an isosceles trapezoid shape, representing a certain distance range (for example, 10 meters (m)).

However, in the comparative example, when the inter-vehicle distance indication is displayed as a virtual image within the display area, overlapping the lane, the angle formed by the left and right two outer lines of the virtual image is smaller than the angle formed by the left and right outer lines defining the lane as viewed from the driver. For this reason, there is a limit to approximation of the shape of the virtual image to the shape of the lane when viewed from the driver. Such an approximation is achieved by displaying the virtual image with the same lateral width (the width in the lateral direction) as that of the lane. However, this scenario leads to an increase in size of device due to an increase in the display area, or causes the virtual image to go beyond the lane with a slight displacement within the display area. To avoid such a circumstance, in at least one embodiment, the virtual image has a narrower width than the lane does.

In the present disclosure, the viewpoint position of the driver is on the right of the center of the vehicle with right-side steering wheel in the lateral direction. The viewpoint position of the driver is on the left of the center of the vehicle with the left-side steering wheel in the lateral direction. The display area in which the virtual image is displayed is usually set in front of the driver's seat (front) of the vehicle.

The driver at the driver's seat drives the vehicle (host vehicle) with an outer line (a first outer line) closer to the driver as a guide, than another outer line of the two left and right outer lines defining the lane in which the vehicle is traveling. To prevent the driver from feeling uncomfortable with the display of the virtual image, an outer line (a second outer line) of the virtual image closer to the first outer line of the lane is slanted to the first outer line at a minimum angle (slant angle of the second outer lint to the first outer line) when viewed from the driver.

In other words, in the comparative example of FIG. 9, a virtual image is symmetrically displayed within the display area without considering whether the viewpoint position of the driver is on the right or left of the center of the vehicle in the lateral direction. This increases the slant angle of the second outer line to the first outer line when viewed from the driver.

Therefore, the present inventors have developed the technique to make such a slant angle smaller than the comparative example of FIG. 9 does through extensive studies.

With the present inventors' technique, the vanishing point of the virtual image is advantageously positioned to make the slant angle of the embodiments of the present disclosure smaller than the comparative example does. Hereinafter, a description is given of the present inventors' technique, using examples. In each embodiment, cases of a vehicle with the right-side steering wheel are described. In each embodiment, the first outer line is the outer line on the right side of the lane and the second outer line is the outer line on the right side of the inter-vehicle distance indication (virtual image). The figures used for the description of each embodiment each is a view from the driver seat of the host vehicle with the right-side steering wheel traveling the same lane as that of the preceding vehicle.

First Example

Figure 10A:
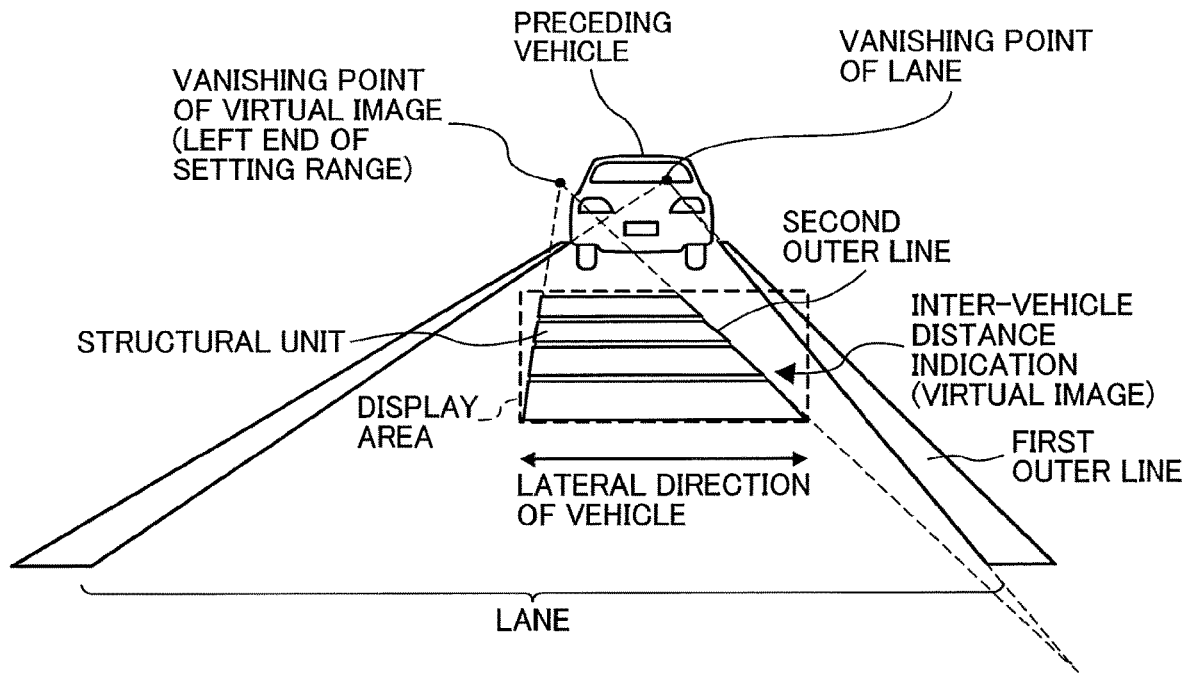
FIGS. 10A through 10C are illustrations of examples in which the vanishing point of the virtual image is displaced from the vanishing point of the lane in the lateral direction of the vehicle according to a first example.
Figure 10B:
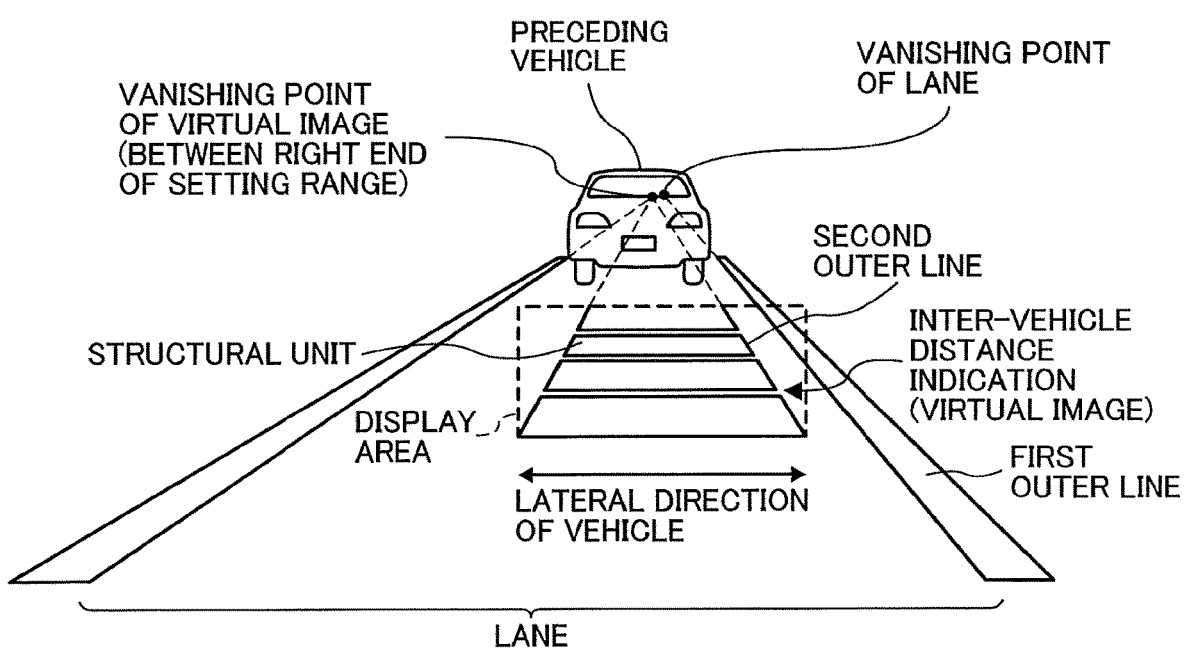
Figure 10C:
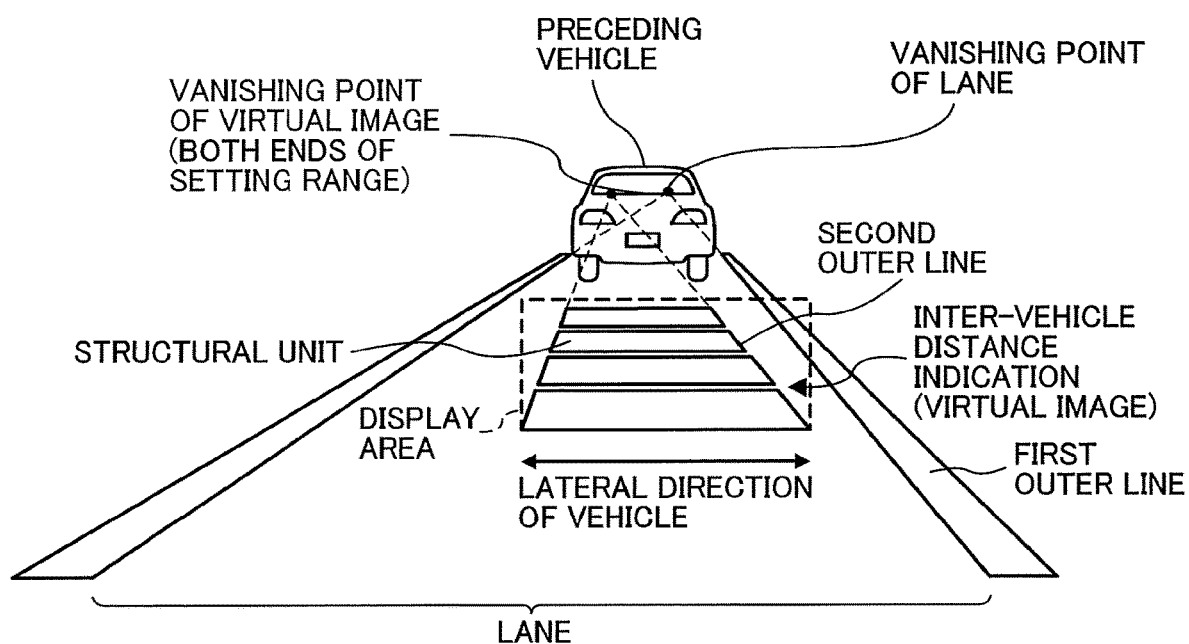

FIGS. 10A through 10C are illustrations of setting examples of the vanishing point of the virtual image according to a first example.

The first example adopts a method of displacing the vanishing point of the virtual image from the vanishing point of the lane in the lateral direction of the vehicle (hereinafter, referred to as the lateral direction). The virtual image displayed in the display area in the first example is the same inter-vehicle distance indication as that of the comparative example. However, the first example differs from the comparative example in that the vanishing point of the virtual image is displaced from the vanishing point of the lane in the lateral direction, and thereby the entire inter-vehicle indication and each structural unit of the inter-vehicle indication have trapezoidal shapes (asymmetric shape) rather than isosceles trapezoid shapes in the first example.

FIG. 10A is an illustration of an example in which the vanishing point of the virtual image is set in the left end of a setting range (in the left of the vanishing point of the lane) in the lateral direction. In FIG. 10A, the slant angle of the second outer line to the first outer line is slightly smaller than the comparative example does.

FIG. 10B is an illustration of an example in which the vanishing point of the virtual image is set in the right end of the setting range (in the vicinity of the left side of the vanishing point of the lane) in the lateral direction. In FIG. 10B, the slant angle is slightly smaller than the comparative example does.

FIG. 10C is an illustration of an example in which the vanishing point of the virtual image is set between the left and right (both) ends of the setting range in the lateral direction. In FIG. 10C, the first outer line and the second outer line are substantially parallel to each other when viewed from the driver.

The "vanishing point of the virtual image" is defined as a point at which a straight line passing through a center point of the lower edge of the display area and a predetermined point at the upper edge of the display area intersects with the horizontal line as seen from the driver. In this case, the vanishing point of the virtual image is displaced in the lateral direction within the setting range by displacing the above-described predetermined point in the lateral (horizontal) direction. For example, when the predetermined point is a point at which the center line of the lane overlaps with the upper edge of the display area, the first outer line and the second outer line are made substantially parallel to each other as seen from the driver (see FIG. 20).

As is understood from the above description, in the vehicle with the right-side steering wheel, the slant angle of the second outer line to the first outer line is smaller than the comparative example does when the setting range of the vanishing point of the virtual image in the lateral direction is set to a predetermined range in the left of the vanishing point of the lane.

In the vehicle with the left-side steering wheel that is the opposite case of the first example, the first outer line is a left-side outer line of the lane, and the second outer line is a left-side outer line of the virtual. The slant angle of the second outer line to the first outer line is made smaller than the comparative example does by determining the setting range of the vanishing point of the virtual image as a predetermined range on the right side of the vanishing point of the lane in the lateral direction.

Second Example

Figure 11A:
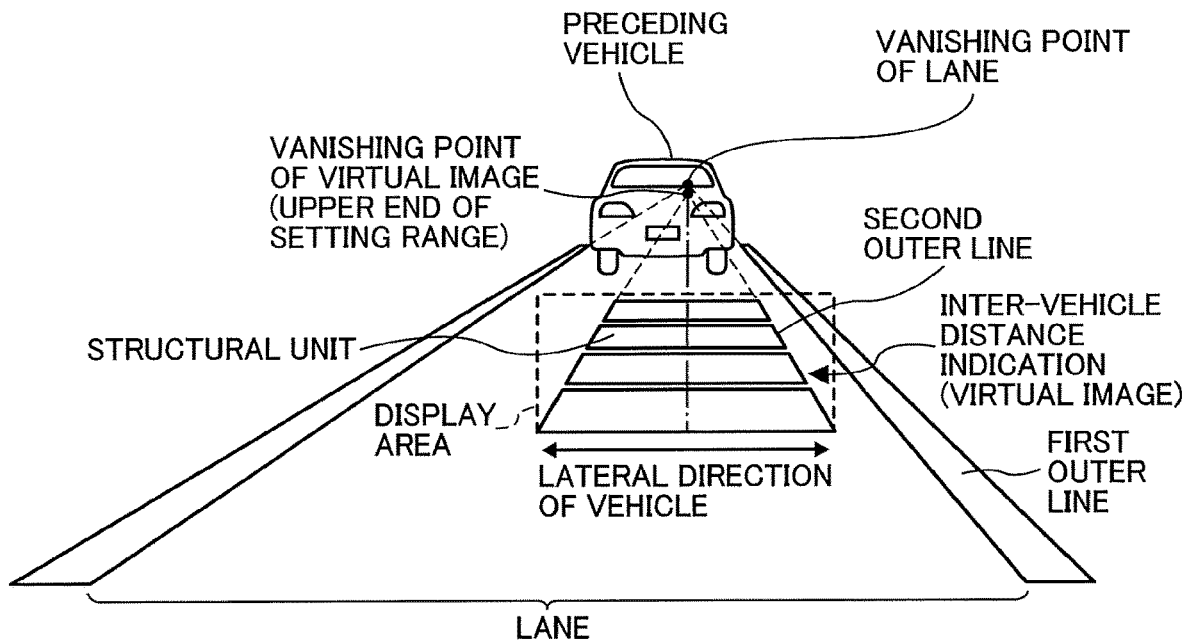
FIGS. 11A through 11C are illustrations of examples in which the vanishing point of the virtual image is displaced from the vanishing point of the lane in the vertical direction of the vehicle according to a second example.
Figure 11B:
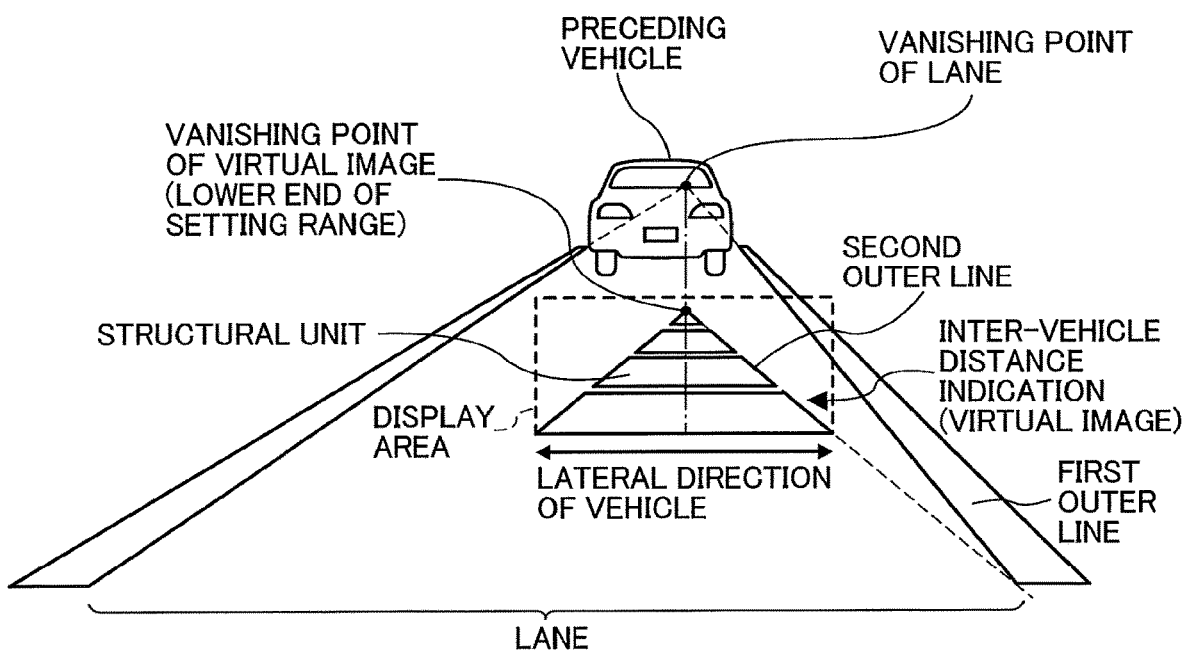
Figure 11C:
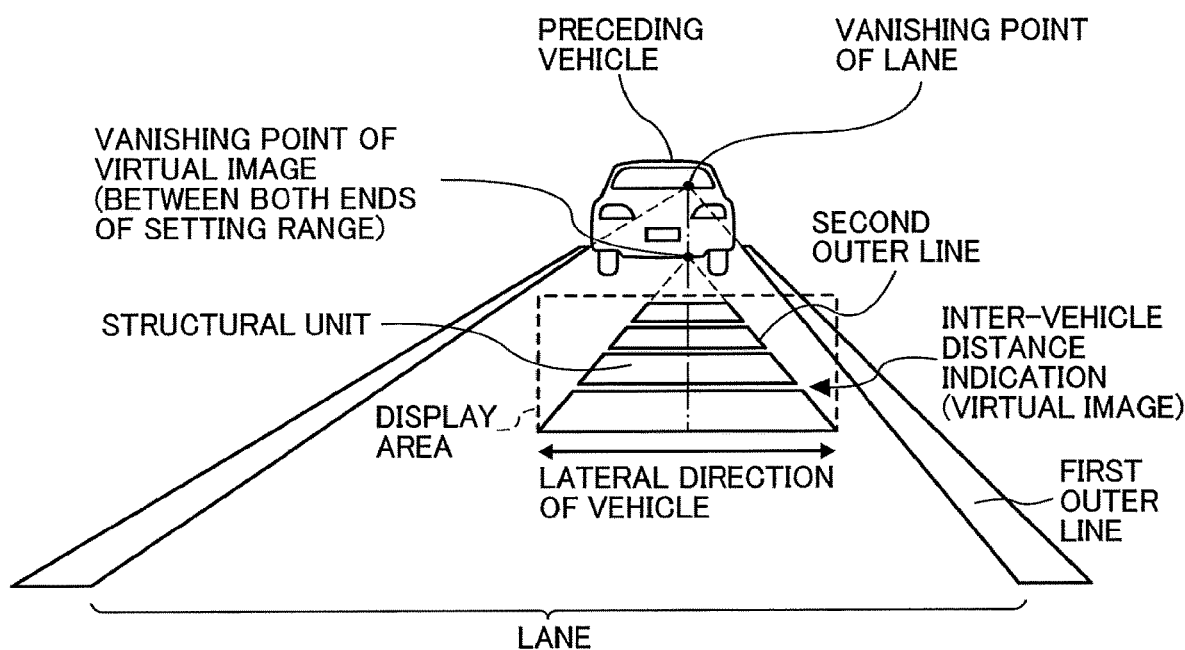

FIGS. 11A through 11C are illustrations of setting examples of the vanishing point of the virtual image according to a second example.

The second example adopts a method of displacing the vanishing point of the virtual image from the vanishing point of the lane in the vertical direction of the vehicle (hereinafter, referred to as the vertical direction). The virtual image displayed in the display area in the second example is the same inter-vehicle distance indication as that of the comparative example. However, in the second example, the vanishing point of the virtual image is displaced from the vanishing point of the lane in the vertical direction. Accordingly, in some cases, the entire inter-vehicle indication and each structural unit of the inter-vehicle indication have isosceles trapezoid shapes (see FIGS. 11A and 11C), and in some other cases, the entire and a part of inter-vehicle indication have isosceles triangle shapes (see FIG. 11B).

FIG. 11A is an illustration of an example in which the vanishing point of the virtual image is set in the upper end of the setting range (near under the vanishing point of the lane) in the vertical direction. In FIG. 11A, the slant angle is slightly smaller than the comparative example does.

FIG. 11B is an illustration of an example in which the vanishing point of the virtual image is set in the lower end of the setting range (under the vanishing point of the lane) in the vertical direction. In FIG. 11B, the slant angle is slightly smaller than the comparative example does.

FIG. 11C is an illustration of an example in which the vanishing point of the virtual image is set between the upper and lower ends (both ends) of the setting range in the vertical direction. In FIG. 11C, the first outer line and the second outer line are substantially parallel to each other when viewed from the driver.

As is understood from the above description, in the vehicle with the right-side steering wheel, the slant angle of the second outer line to the first outer line is smaller than the comparative example does when the setting range of the vanishing point of the virtual image in the vertical direction is set to a predetermined range under the vanishing point of the lane.

In the vehicle with the left-side steering wheel that is the opposite case of the second example, the first outer line is a left-side outer line of the lane, and the second outer line is a left-side outer line of the virtual image. Same as in the second example 2, the slant angle of the second outer line to the first outer line is made smaller than the comparative example does by determining the setting range of the vanishing point of the virtual image as a predetermined range under the vanishing point of the lane in the vertical direction.

Third Example

FIGS. 12A through 14C are illustrations of setting examples of the vanishing point of the virtual image according to a third example.

The third example adopts a method of displacing the vanishing point of the virtual image from the vanishing point of the lane in the lateral and vertical directions. The virtual image displayed in the display area in the third example is the same inter-vehicle distance indication as that of the comparative example. However, in the third example, the vanishing point of the virtual image is displaced from the vanishing point of the lane in the lateral (horizontal) direction and the vertical directions. Accordingly, in some cases, the entire inter-vehicle indication and each structural unit of the inter-vehicle indication have trapezoid shapes (see FIGS. 12B, 12C, 13B, 13C, 14B, and 14C), and in some other cases, the entire and a part of inter-vehicle indication have triangle shapes (see FIGS. 12A, 13A, and 14A).

Figure 12A:
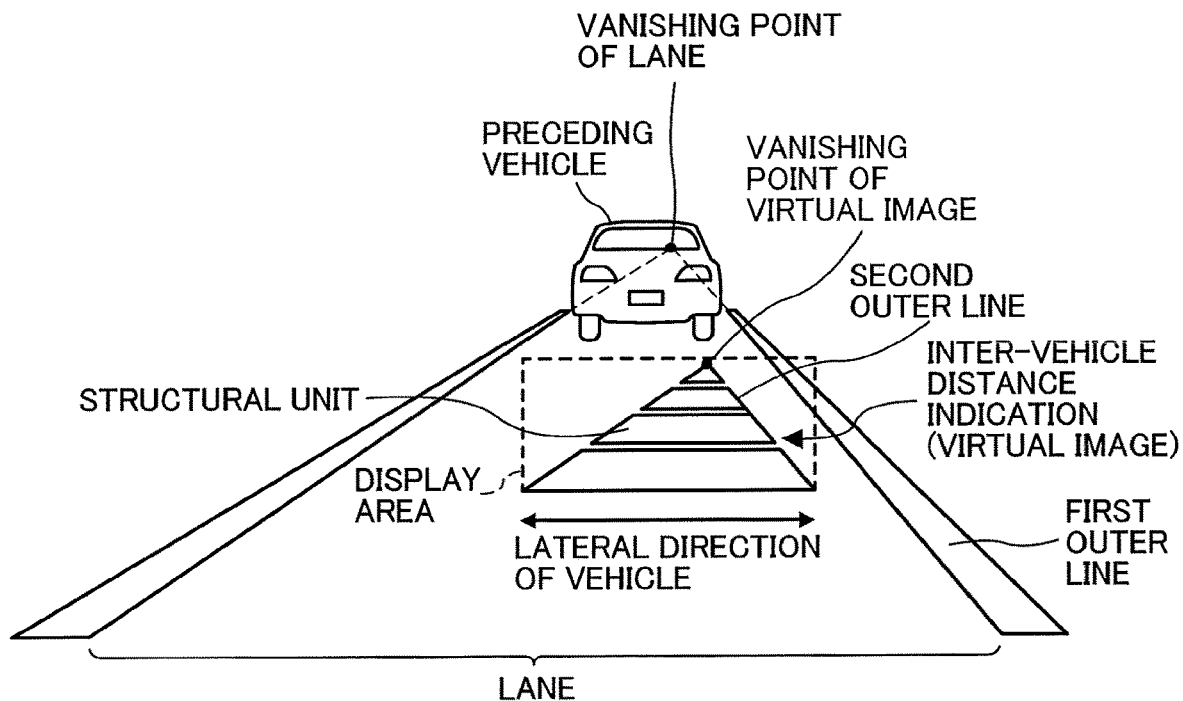
FIGS. 12A through 12C each is an illustration of a first case in which the vanishing point of the virtual image is displaced from the vanishing point of the lane in the lateral direction and the vertical direction of the vehicle according to a third example.
Figure 12B:
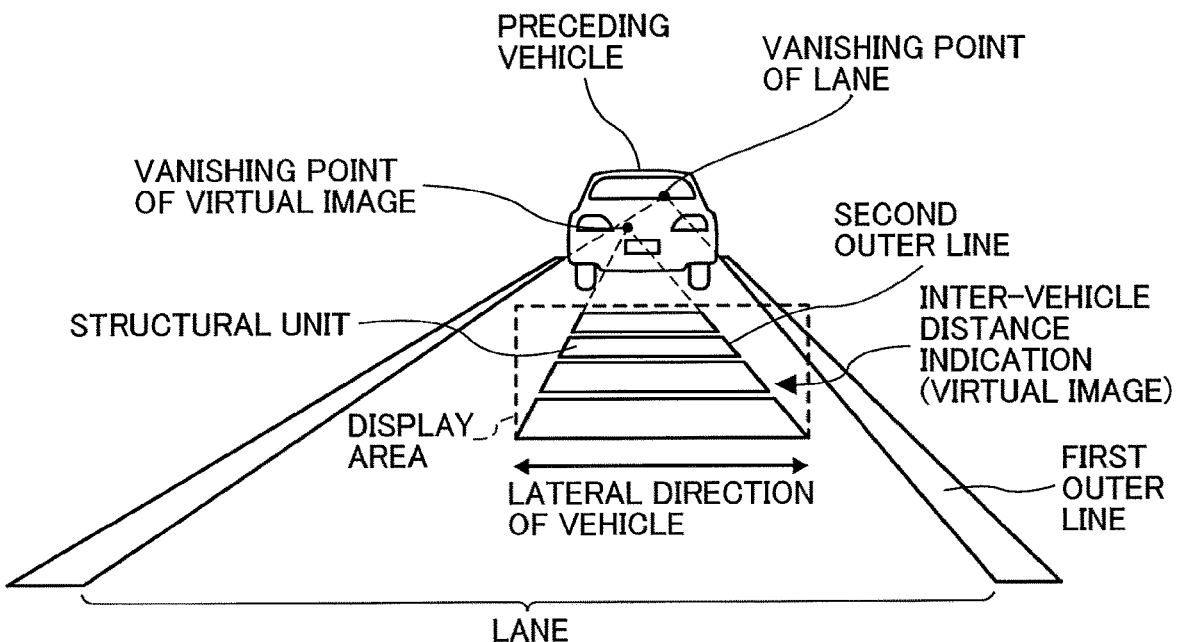
Figure 12C:
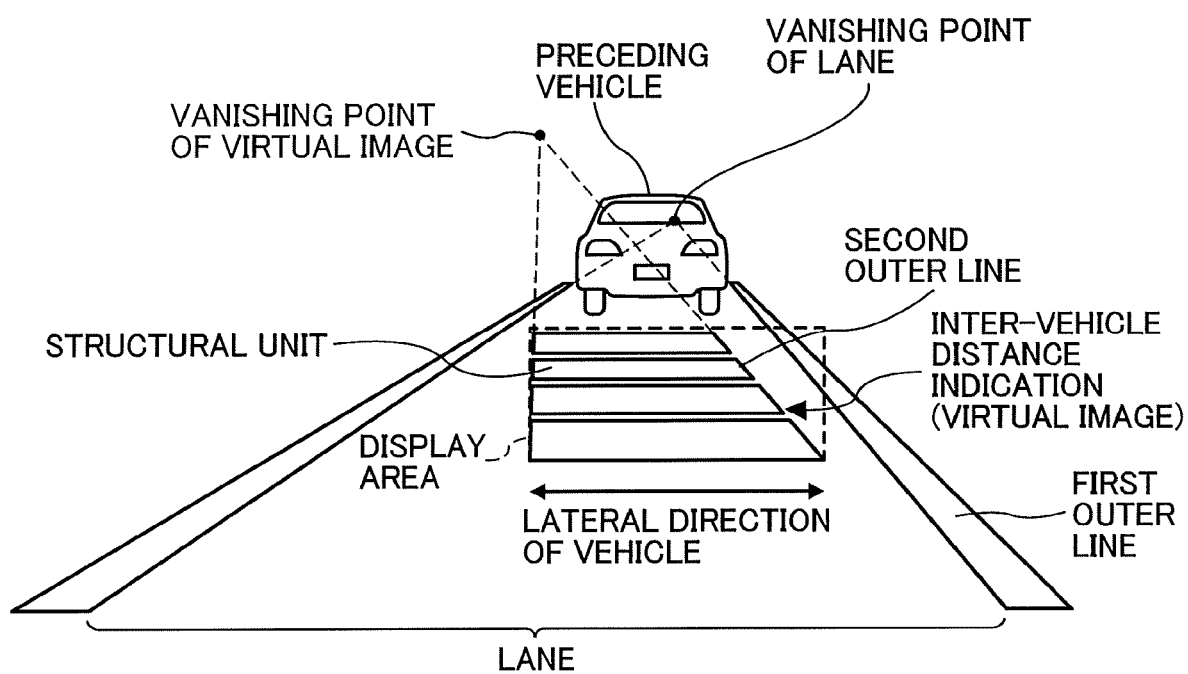

FIGS. 12A through 12C are illustrations of a first case in which the first outer line is substantially parallel to the second outer line according to the third example. This configuration allows the vanishing point of the virtual image to be set in any position within a predetermined range (a range that allows the virtual image to be displayed within the display area) along the second outer line (see FIGS. 12A through 12C).

Figure 13A:
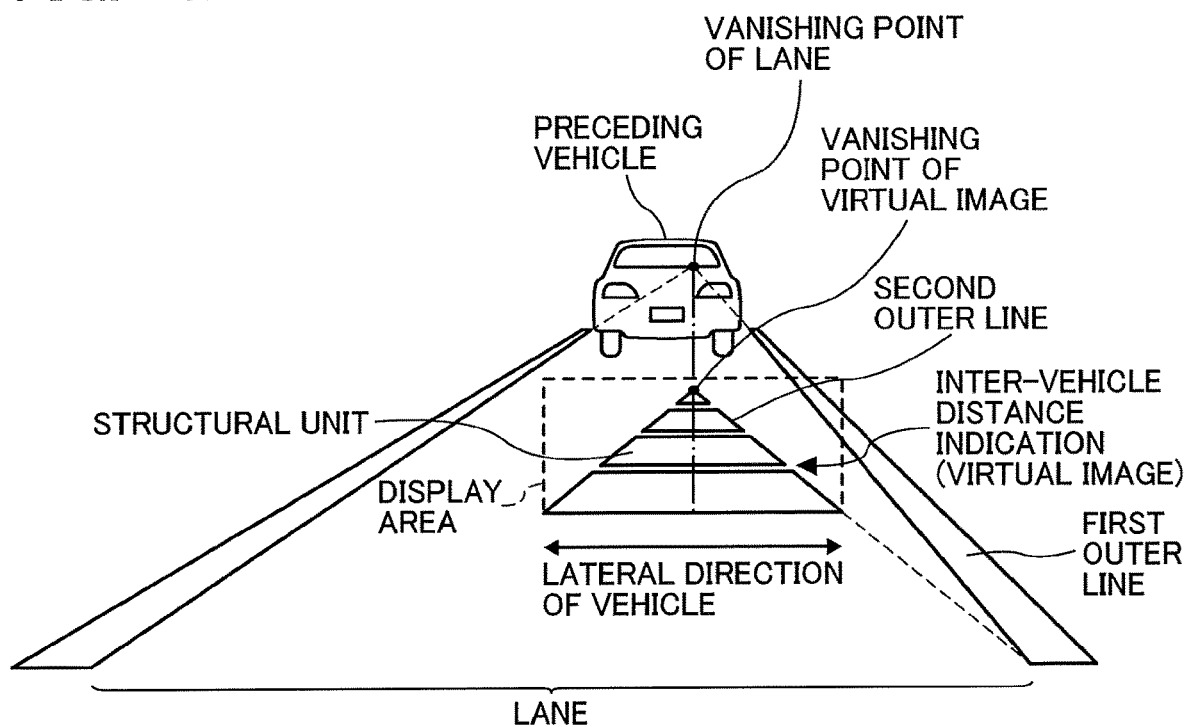
FIGS. 13A through 13C each is an illustration of a second case according to the third example.
Figure 13B:
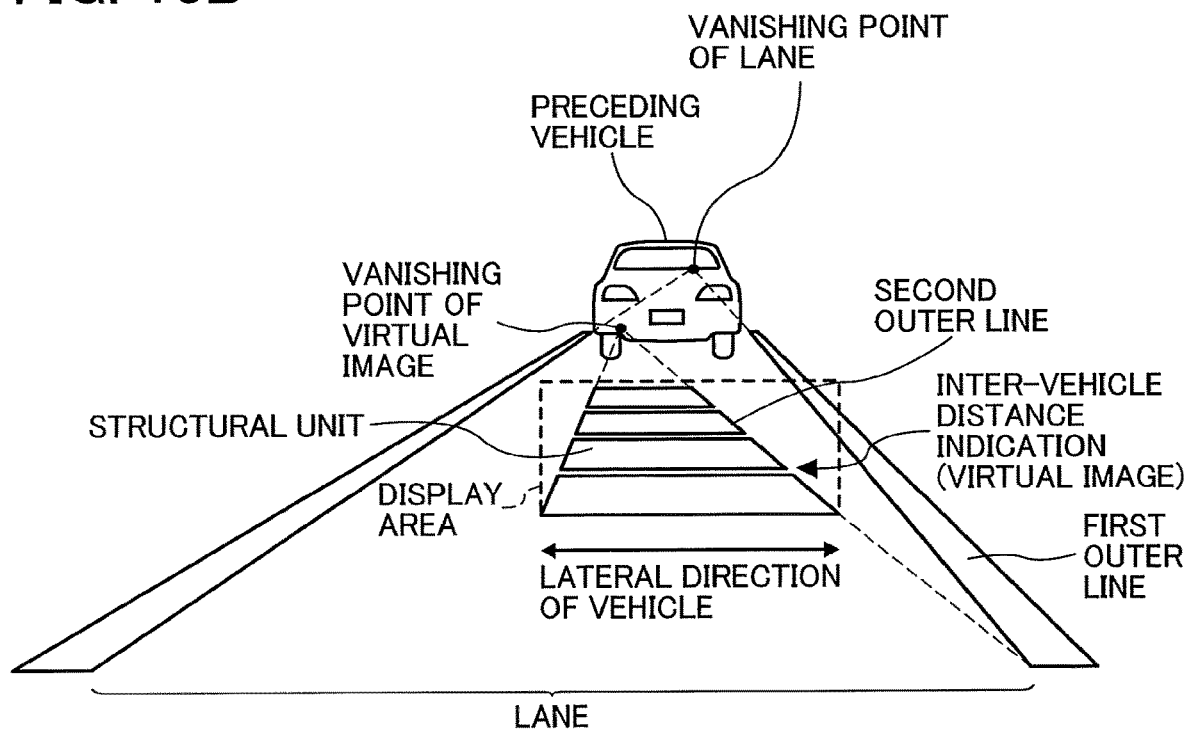
Figure 13C:
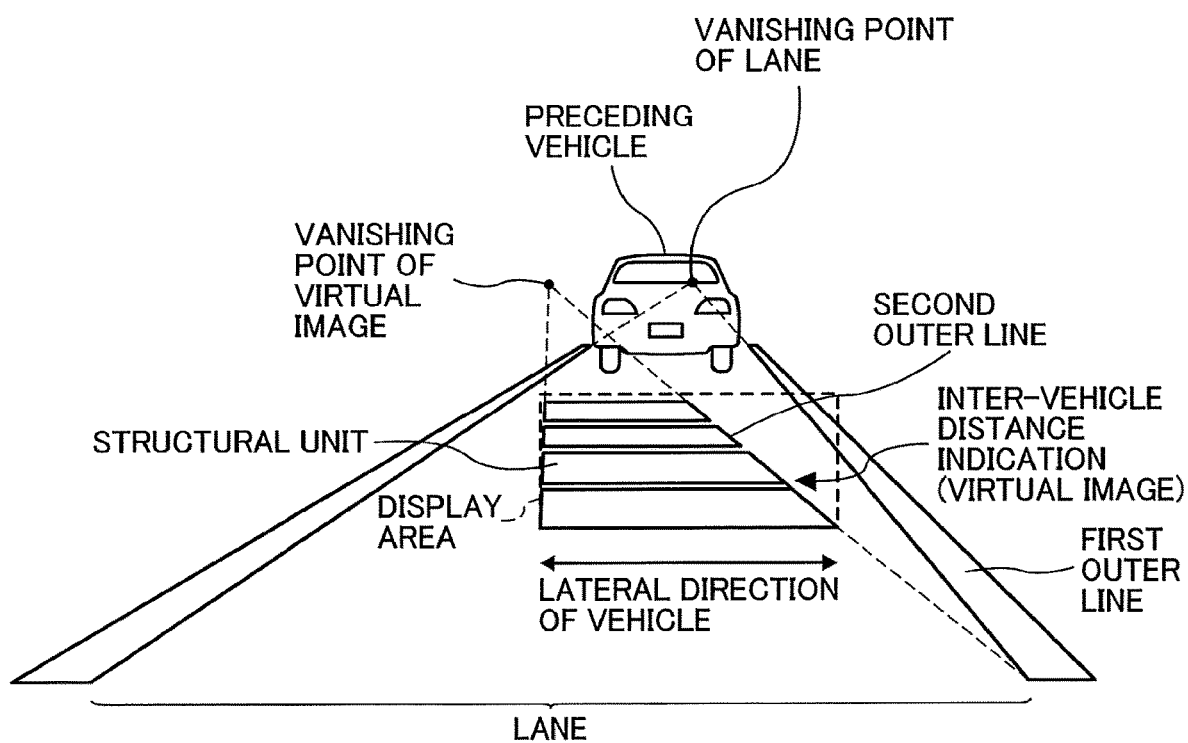

FIGS. 13A through 13C are illustrations of a second case in which the slant angle of the second outer line to the first outer line is slightly smaller than the comparative example does. This configuration allows the vanishing point of the virtual image to be set in any position within a predetermined range (a range that allows the virtual image to be displayed within the display area) along the second outer line (see FIGS. 13A through 13C). In FIGS. 13A through 13C, the slant angle and orientation of the slant are common.

Figure 14A:
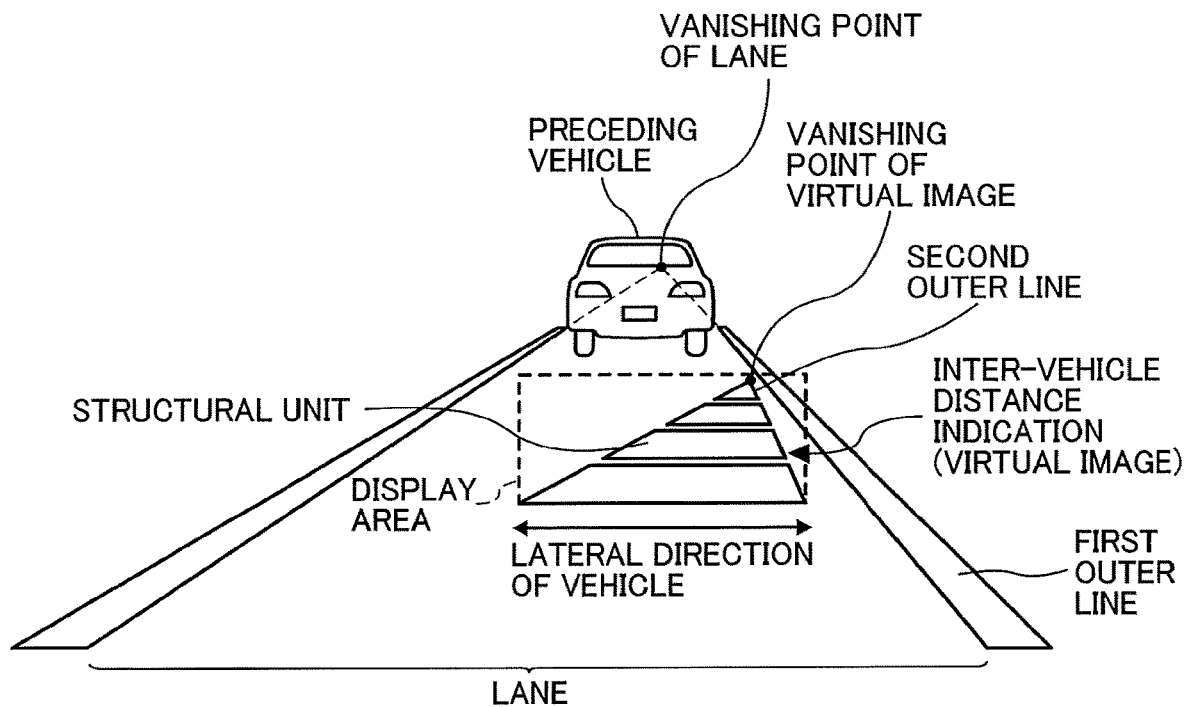
FIGS. 14A through 14C each is an illustration of a third case according to the third example.
Figure 14B:
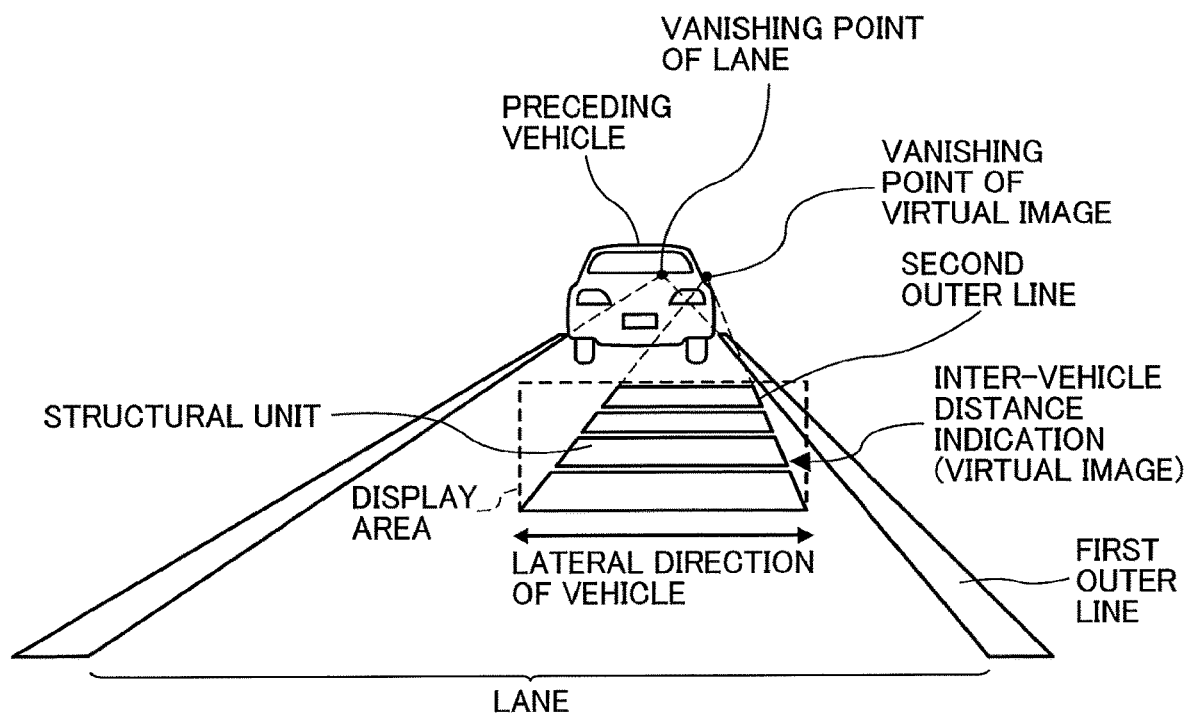
Figure 14C:
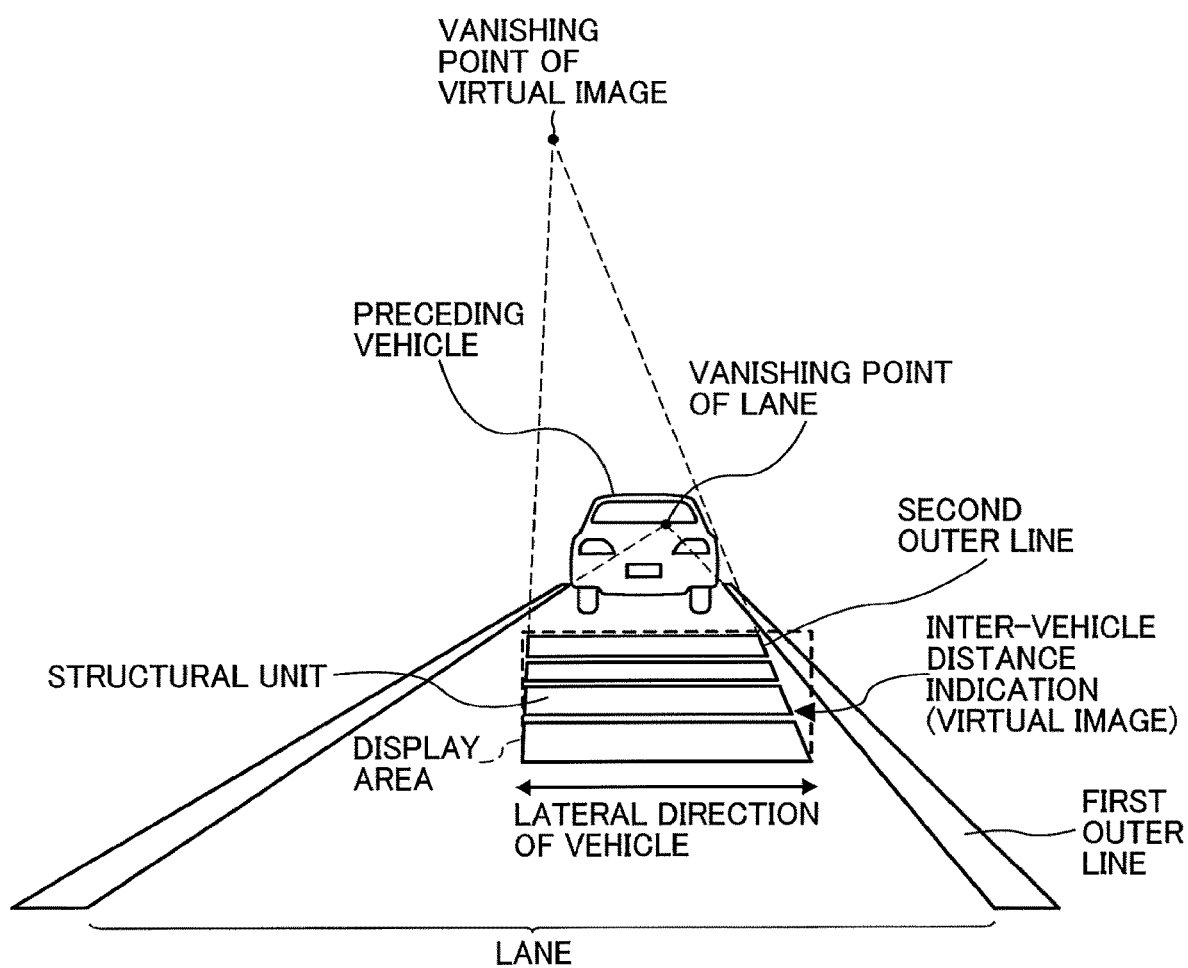

FIGS. 14A through 14C are illustrations of a third case in which the slant angle of the second outer line to the first outer line is slightly smaller than the comparative example does, and the orientation of the slant is opposite of the second case in FIGS. 13A through 13C. This configuration allows the vanishing point of the virtual image to be set in any position within a predetermined range (a range that allows the virtual image to be displayed within the display area) along the second outer line (see FIGS. 14A through 14C). In FIGS. 14A through 14C, the slant angle and orientation of the slant are common.

As described above, the configuration according to the third example allows the vanishing point of the virtual image to be set in any position within a predetermined range (a range that allows the virtual image to be displayed within the display area) along the second outer line that is within a predetermined slant range with respect to the first outer line (see FIGS. 12A through 14C).

Figure 15:
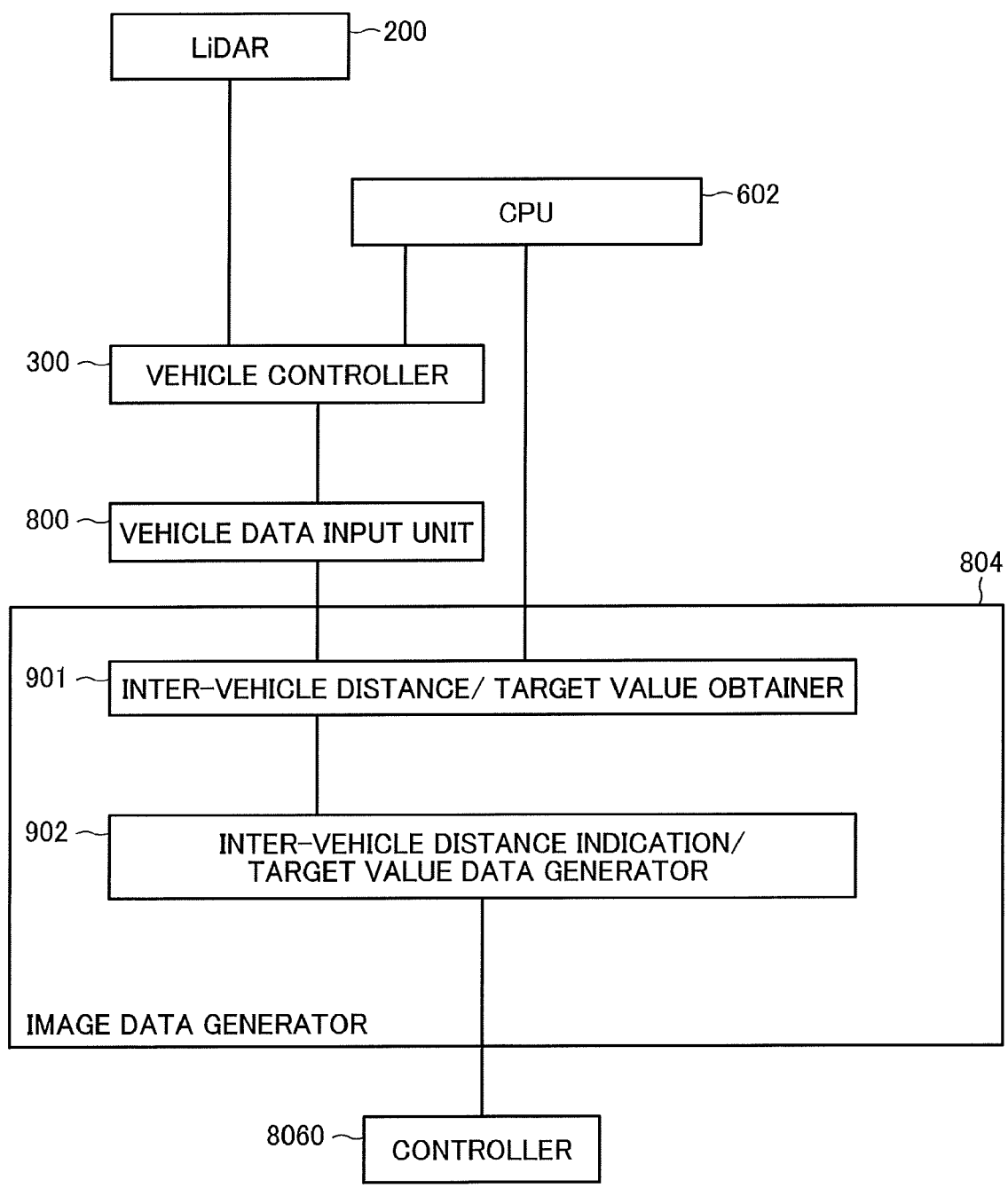
FIG. 15 is a block diagram of a first example configuration of an image data generator according to an embodiment of the present disclosure.

To achieve the above-described Examples 1 through 3, the HUD 100 includes a light detection ranging device (LiDAR) 200 as a detection system to detect an object (for example, a preceding vehicle) and the image data generator 804 as illustrated in FIG. 15, in addition to the above-described configuration. In this case, the image data generator 804 further includes components to generate image data.

In some embodiments, the detection system is dedicated to display an indication of distance between vehicles. However, no limitation is not intended herein. In some other embodiments, a detector that is used for an automatic vehicle control such as an automatic brake and an automatic steering is used to display an indicator. When such a detector is used, the HUD does not include the detection system.

The detection system or the detector may be any device that is capable of detecting the presence or absence and the position of an object in front of (including diagonally in front of) the vehicle. In some embodiments, a radar that uses a light-emitting diode (LED) as the light source, a millimeter-wave radar, an infrared radar, a monocular camera, a stereo camera, or a combination thereof is used instead of the LiDAR that uses, e.g., a semiconductor laser as the light source.

The LiDAR 200 includes a light projecting system, a light receiving system, and a processing system. The light projection system includes at least one laser light source (for example, a semiconductor laser). The light receiving system includes at least one light receiving element (for example, a photodiode) that receives light reflected from the object projected from the light projecting system. The processing system calculates a distance to the object. The projection range of the LiDAR 200 is a predetermined range ahead of and diagonally in front of the vehicle. The range finding method of the LiDAR 200 is a direct time of flight (TOF) method of calculating the time difference between the light emitting timing of the laser light source and the light receiving timing of the light receiving element to obtain the distance to the object based on the time difference. Alternatively, in some embodiments, the range finding method of the LiDAR 200 is an indirect TOF method of dividing the received-light signal of the light receiving element into a plurality of phase signals and calculating the time difference based on the plurality of phase signals to obtain the distance to the object based on the time difference. The projection system refers to any of a scanning projection system and the non-scanning projection system.

The LiDAR 200 is mounted in the vicinity of, for example, a front bumper or a rearview mirror of an automobile. The LiDAR 200 outputs three-dimensional positional information (referred to also as a distance image) as a detection result to the vehicle controller 300 when an object (a preceding vehicle in front of the host vehicle) is detected.

The vehicle controller 300 is a device that controls the entirety of the host vehicle. The vehicle controller 300 obtains a distance (inter-vehicle distance) between the host vehicle and the preceding vehicle and a relative speed of the preceding vehicle based on the received three-dimensional positional information and with changes in the three-dimensional positional information. The vehicle controller 300 further sets a target value (an appropriate lower limit value of the inter-vehicle distance) of the inter-vehicle distance according to the relative speed of the preceding vehicle. Subsequently, the vehicle controller 300 transmits the set target value and the inter-vehicle distance to the image data generator 804 via the vehicle data input unit 800 while transmitting the CPU 602 an instruction for displaying, hiding, or updating an inter-vehicle distance indication according to the presence or absence of the preceding vehicle and the position thereof.

The image data generator 804 includes an inter-vehicle distance/target value obtainer 901 and an inter-vehicle distance indication/target value data generator 902.

The inter-vehicle distance/target value obtainer 901 obtains a current inter-vehicle distance and target value of the inter-vehicle distance, from the vehicle controller 300, and transmits the obtained current inter-vehicle distance and target value of the inter-vehicle distance to the inter-vehicle distance indication/target value data generator 902, according to an instruction of the CPU 602.

The inter-vehicle distance indication/target value data generator 902 generates inter-vehicle distance indication/target value data based on the received current inter-vehicle distance and target value of the inter-vehicle distance, a reference data (display data of an isosceles trapezoid shape as a whole that includes a plurality of isosceles trapezoid shape areas) that is a template of the inter-vehicle distance indication, and the positional information of a vanishing point of the inter-vehicle distance indication (the amount and direction of displacement from the vanishing point of the lane) predetermined as in, e.g., the first examples 1 through 3. The data generated by the inter-vehicle distance indication/target value data generator 902 includes the image data of the inter-vehicle distance indication and the image data of the target value of the inter-vehicle distance. Then, the inter-vehicle distance indication/target value data generator 902 transmits the generated data to the controller 8060.

The controller 8060 controls the LD driver 6111 and the MEMS controller 615 based on the received inter-vehicle distance indication/target value data, to display the inter-vehicle distance indication and the target value of the inter-vehicle distance as a virtual image within the display area.

Figure 19:
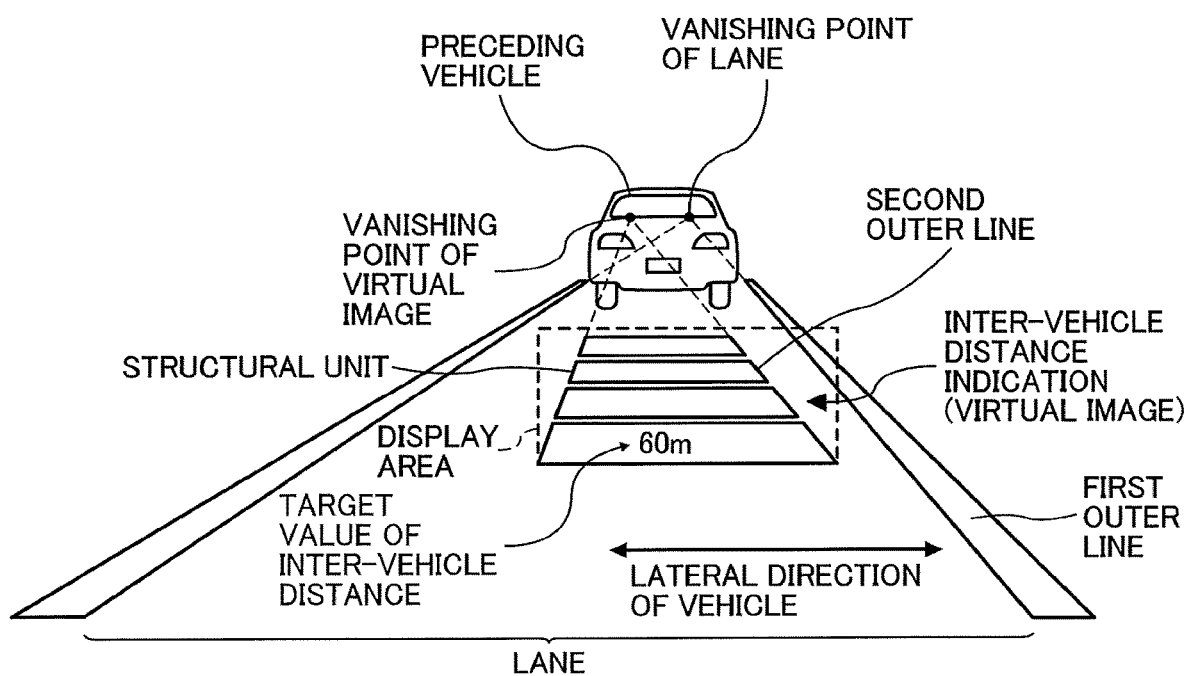
FIG. 19 is an illustration of an example in which a virtual image including an inter-vehicle distance indication and a target value of the inter-vehicle distance is displayed.

With the configuration in which the inter-vehicle distance indication (for example, one division as the vertical width of each structural unit is 10 meters (m)) indicative of a distance between the host vehicle and the preceding vehicle and the target value of the inter-vehicle distance is displayed within the display area, overlapping a road surface (lane) between the host vehicle and the preceding vehicle as viewed from the driver as illustrated in FIG. 19, the driver easily recognizes the current inter-vehicle distance and the target value of the inter-vehicle distance without having to look away from the sight ahead of the host vehicle. Thus, the driver, for example, reduces the speed of the vehicle to maintain an appropriate following distance (inter-vehicle distance). FIG. 19 is an illustration of a case in which the current inter-vehicle distance is, for example, 40 m and the target value of the inter-vehicle distance is, for example, 60 m.

Figure 16:
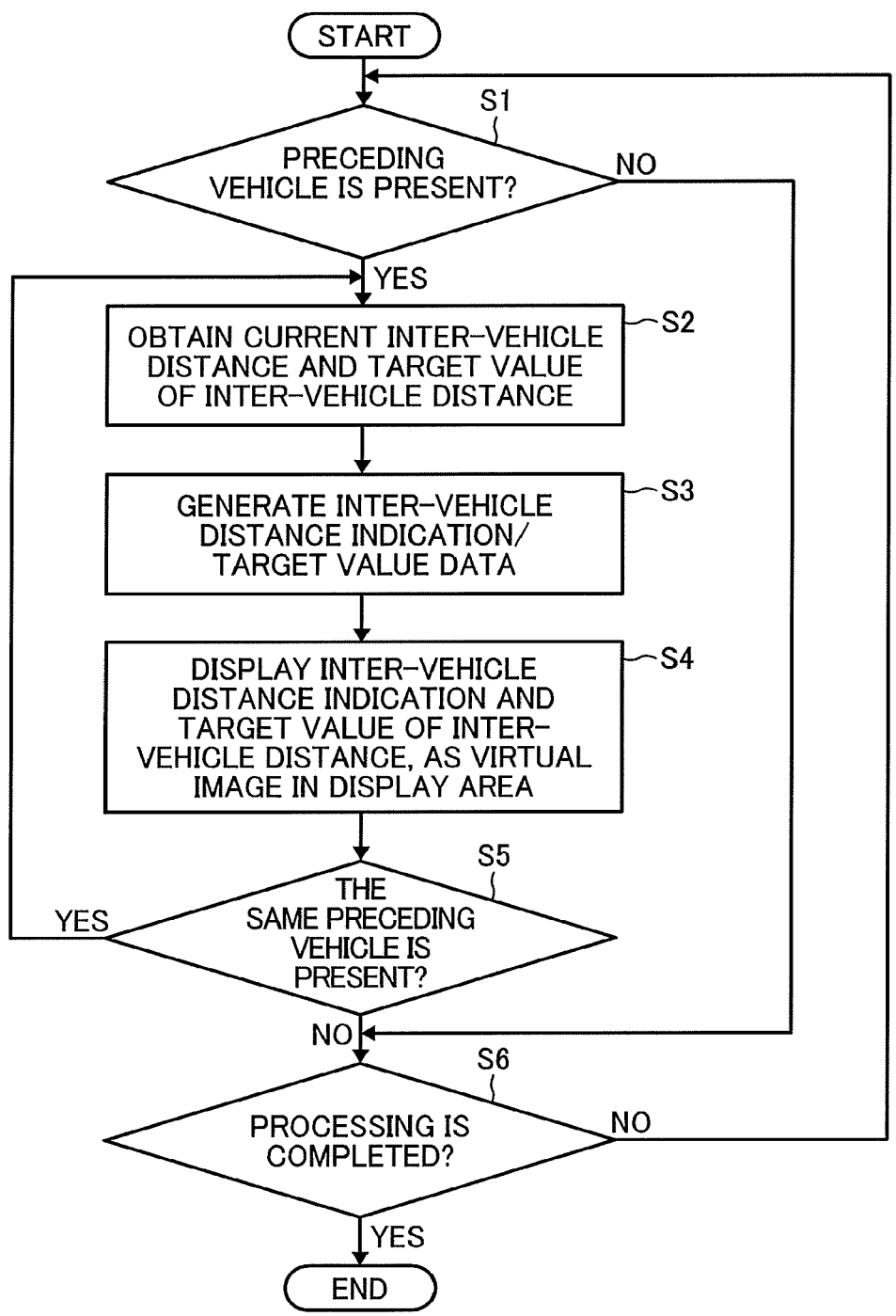
FIG. 16 is a flowchart of display processing.

Next, a description is given of display processing performed by the HUD 100 according to the present embodiment, with referring to FIG. 16. FIG. 16 is a flowchart of a computational algorithm executed by the CPU 602 according to the present embodiment. The display process starts when the electrical system of, for example, a vehicle mounted with the HUD 100 is turned on.

In the first step S1, the CPU 602 determines whether any preceding vehicle is present. More specifically, the CPU 602 determines that a preceding vehicle is present in response to a reception of a notification of the presence of the preceding vehicle from the vehicle controller 300 that receives a detection result of the LiDAR 200. When an affirmative determination is made in step S1, the process proceeds to step S2. When a negative determination is made in step S1, the process proceeds to step S6.

In step S2, the CPU 602 obtains the current inter-vehicle distance between the host vehicle and the preceding vehicle and the current target value of the inter-vehicle distance. Specifically, the inter-vehicle distance/target value obtainer 901 obtains the current inter-vehicle distance and target value of the inter-vehicle distance via the vehicle controller 300 and the vehicle data input unit 800, and transmits the obtained data to the inter-vehicle distance indication/target value data generator 902. Note that the "current inter-vehicle distance and target value of the inter-vehicle distance" refer to an updated inter-vehicle distance and a target value of the updated inter-vehicle distance obtained by the vehicle controller 300 at the time at which the CPU 602 receives an instruction for displaying, hiding, or updating the inter-vehicle distance indication, from the vehicle controller 300.

In the next step S3, the CPU 602 generates inter-vehicle distance indication/target value data. Specifically, the inter-vehicle distance indication/target value data generator 902 generates the inter-vehicle distance indication/target value data based on the reference data of the inter-vehicle distance indication, the obtained current inter-vehicle distance, the target value of the inter-vehicle distance, and the predetermined position of the vanishing point of the inter-vehicle distance indication, transmitting the generated data to the controller 8060.

Figure 20:
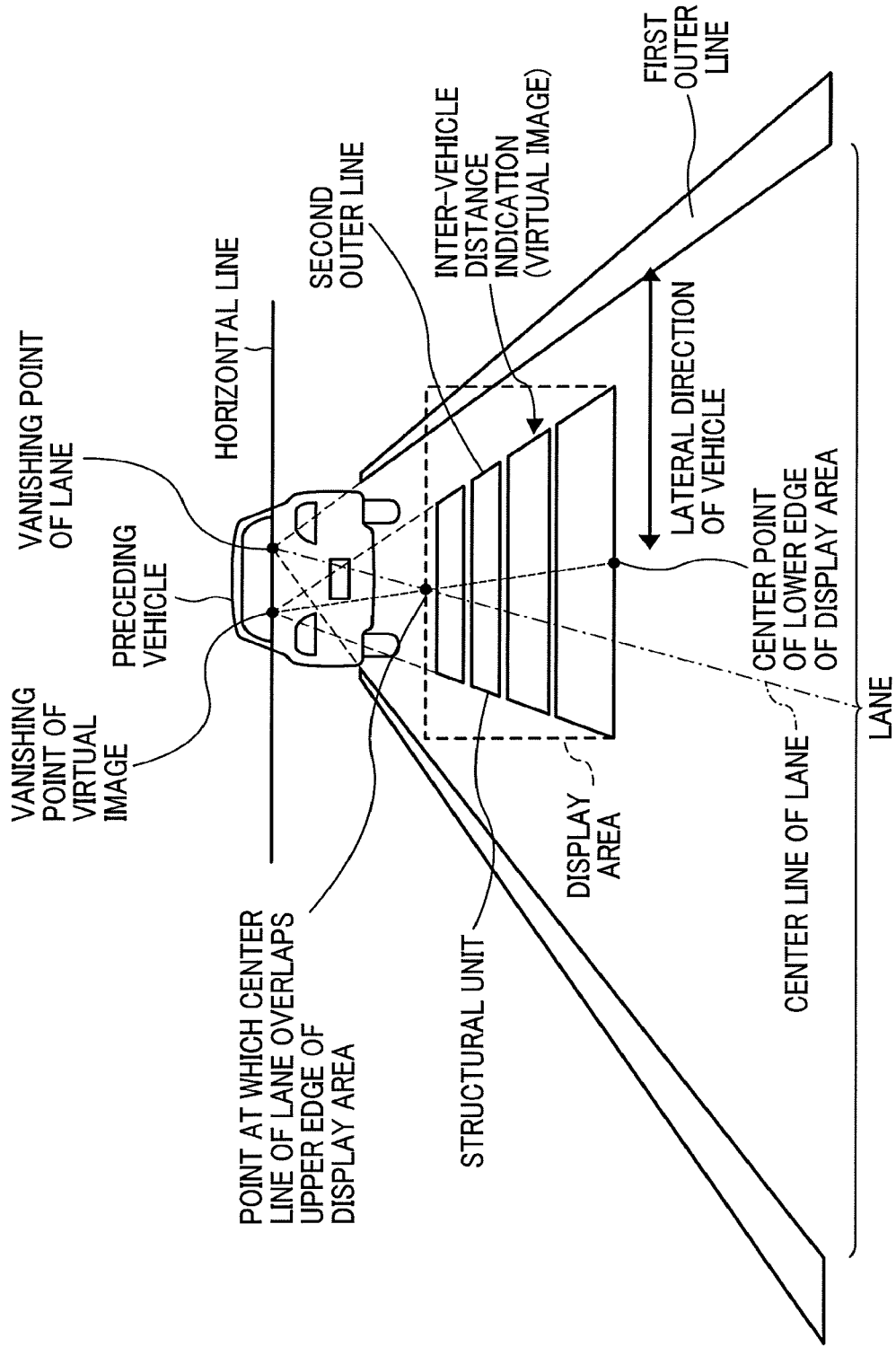
FIG. 20 is an illustration of a configuration according to the first example.

Prior to the display processing, for example, a vehicle-installed camera is used to capture an image of the lane (a road surface in front) on which the host vehicle is traveling, the inter-vehicle distance indication is superimposed on the lane in the captured image, falling within the display area, such that the slant angle of the second outer line to the first outer line is smaller than the comparative example does (as illustrated in FIG. 20) as viewed from the driver. Thus, the position of the vanishing point of the inter-vehicle distance indication is set.

In the following step S4, the CPU 602 displays the inter-vehicle distance indication and the target value of the inter-vehicle distance as a virtual image within the display area. More specifically, the controller 8060 controls the LD 6111 and the MEMS controller 615 based on the received inter-vehicle distance indication/target value data, to display the inter-vehicle distance indication and the target value of the inter-vehicle distance as a virtual image within the display area.

In the next step S5, the CPU 602 determines whether the preceding vehicle is present. More specifically, the CPU 602 determines that the preceding vehicle is present in response to a reception of a notification of the presence of the preceding vehicle from the vehicle controller 300 that receives a detection result of the LiDAR 200. When a negative determination is made in step S5, the process proceeds to step S6. When an affirmative determination is made in step S5, the process returns to step S2.

In step S6, the HUD 100 determines whether the process is completed. When an affirmative determination is made in step S12, the processing flow ends. When a negative determination is made in step S12, the process returns to step S1. In the present embodiment, the processing is continued when the electrical system of a vehicle (the vehicle of the driver) mounted with the HUD 100 remains turned on, and the processing ends when the electrical system is turned off.

Figure 17:
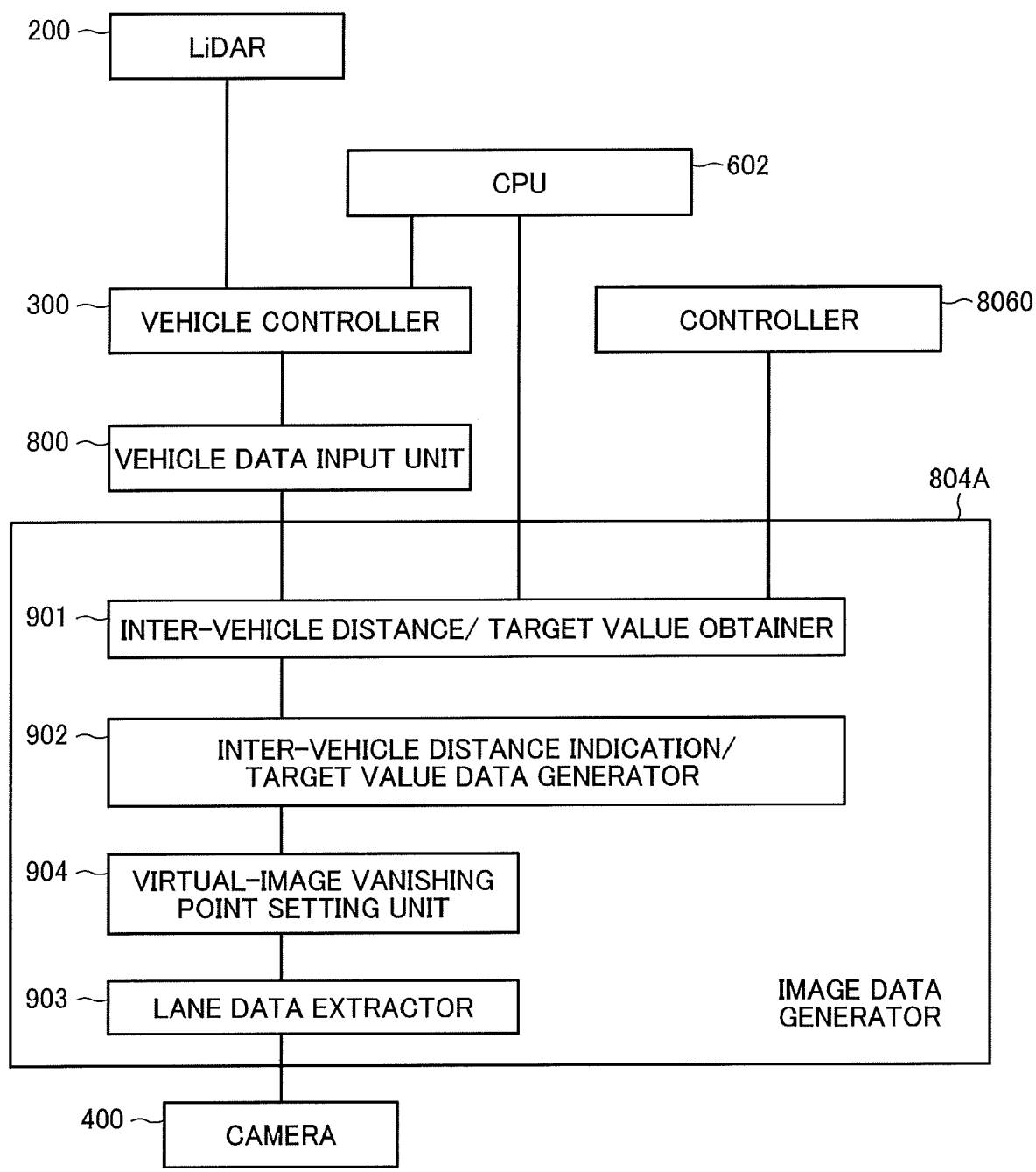
FIG. 17 is a block diagram of a second example configuration of an image data generator according to an embodiment of the present disclosure.

In the configuration according to a modification as illustrated in FIG. 17, a camera 400 for capturing an image of the road surface in front of the vehicle is installed, and an image data generator 804A according to a modification further serves to set the vanishing point of the inter-vehicle distance indication.

Specifically, the image data generator 804A according to the modification further includes a lane data extractor 903 and a virtual-image vanishing point setting unit 904 in addition to the configuration of the image data generator 804 according to the above-described embodiments.

The camera 400 is a monocular camera or a stereo camera. The camera 400 is disposed in the host vehicle such that the road surface in front of the host vehicle falls within the angle of view. The camera 400 captures an image of the road surface in front at the receiving timing of the instruction for starting an image capturing from the CPU 602. Then, the camera 400 transmits the captured image to the lane data extractor 903.

The lane data extractor 903 extracts, from the received captured image, information (hereinafter, referred to simply as lane data) regarding the lane that includes, e.g., data of outer lines defining the lane and data including the vanishing point of the lane and any point on the outer lines defining the lane. Then, the lane data extractor 903 transmits the extracted information to the virtual-image vanishing point setting unit 904.

The virtual-image vanishing point setting unit 904 sets, based on the received lane data, the position of the vanishing point of the inter-vehicle distance indication (virtual image) such that the slant angle of the second outer line to the first outer line is smaller than the comparative example does as viewed from the driver, and all of the structural units of the inter-vehicle distance indication fall within the display area. Then, the virtual-image vanishing point setting unit 904 transmits the set position to the inter-vehicle distance indication/target value data generator 902.

The inter-vehicle distance indication/target value data generator 902 generates inter-vehicle distance indication/target value data based on the current inter-vehicle distance and target value of the inter-vehicle distance output from the vehicle controller 300, a reference data (display data of an isosceles trapezoid shape as a whole that includes a plurality of structural units each with an isosceles trapezoid shape) of the inter-vehicle distance indication, and the position of a vanishing point of the inter-vehicle distance indication output from the virtual-image vanishing point setting unit 904. The data generated by the inter-vehicle distance indication/target value data generator 902 includes the image data of the inter-vehicle distance indication and the image data of the target value of the inter-vehicle distance. The inter-vehicle distance indication/target value data generator 902 transmits the generated data to the controller 8060.

The controller 8060 controls the LD driver 6111 and the MEMS controller 615 based on the received inter-vehicle distance indication/target value data, to display the inter-vehicle distance indication and the target value of the inter-vehicle distance as a virtual image within the display area.

In the configuration according to variation, the CPU 602 sets the position of the vanishing point of the virtual image only when displaying the inter-vehicle distance indication for the first time after the start up of the device. Alternatively, in some embodiments, the CPU 602 sets the position of the vanishing point of the virtual image at each time of switching the inter-vehicle distance indication from display to non-display. Alternatively, in some other embodiments, the CPU 602 sets the position of the vanishing point of the virtual image at regular intervals.

Figure 18:
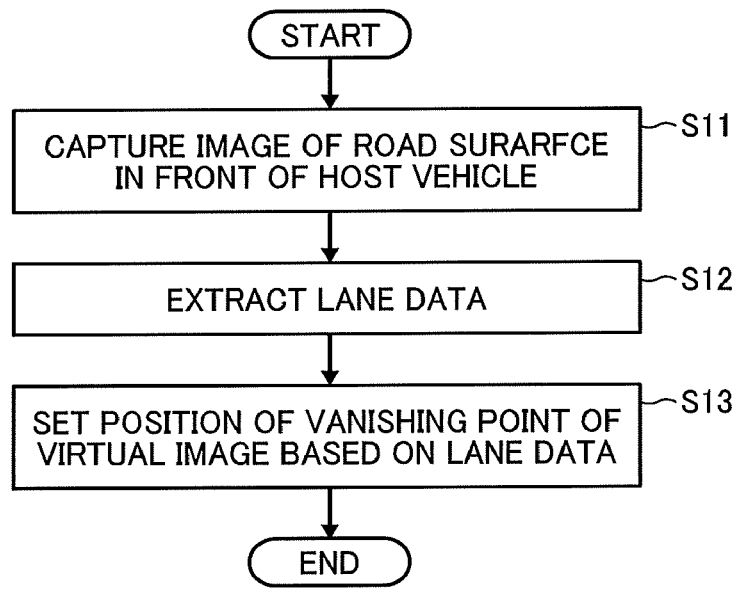
FIG. 18 is a flowchart of virtual-image vanishing point setting processing.

A description is given below of virtual-image vanishing point setting processing according to a variation, with reference to FIG. 18. FIG. 18 is a flowchart of a computational algorithm executed by the CPU 602 according to the present embodiment.

Initially in step S11, the CPU 602 captures an image of a road surface in front of the host vehicle. More specifically, the camera 400 captures an image of the road surface in front of the host vehicle and transmits image data of the captured image to the lane data extractor 903.

In the next step S12, the CPU 602 extracts information (lane data) regarding the lane in which the host vehicle is traveling. More specifically, the lane data extractor 903 extracts the lane data from the received image data of the captured image, and transmits the lane data to the virtual-image vanishing point setting unit 904.

In the last step S13, the CPU 602 sets the position of the vanishing point of the virtual image based on the lane data. More specifically, the virtual-image vanishing point setting unit 904 sets, based on received lane data, the vanishing point of the virtual image such that the slant angle of the second outer line to the first outer line is smaller than the comparative example does as viewed from the driver (as illustrated in FIG. 20).

In view of the first aspect, the HUD 100 according to the above-described embodiments is a display device that illuminates a windshield 50 (transmission and reflection member) mounted on a vehicle (a mobile object) with light forming an image, and displays a virtual image within a display area to overlap the lane (an object outside the mobile object) in which the vehicle is traveling. In the display device, the vanishing point of the virtual image is displaced from the vanishing point of the lane as viewed from the driver (a viewer at the driver's seat) of the vehicle.

In at least one embodiment, the HUD 100 includes an image forming unit that includes an optical scanning device 10 and a screen 30, and a concave mirror 40 (a light guide). The image forming unit forms an image with light such that the vanishing point of the virtual image is displaced from the vanishing point of the lane as viewed from the driver. The concave mirror 40 guides the light forming the image to the windshield 50.

In view of the second aspect, the HUD 100 according to the above-described embodiments is a display device that illuminates a windshield 50 (transmission and reflection member) mounted on a vehicle (a mobile object) with light forming an image, and displays a virtual image within a display area to overlap the lane (an object outside the mobile object) in which the vehicle is traveling. The display device includes an image forming unit that includes an optical scanning device 10 and a screen 30, and a concave mirror 40 (light guide). The image forming unit forms an image with light such that the vanishing point of the virtual image is displaced from the vanishing point of the lane as viewed from the driver (a viewer at the driver's seat) of the vehicle. The concave mirror 40 guides the light forming the image to the windshield 50.

The HUD 100 according to the present embodiment allows the orientation of the outer line of the virtual image on a side with respect to the virtual image in the lateral (horizontal) direction to approximate the orientation of the outer line of the lane on the same side as the side with respect to the virtual image, as compared to the case in which the vanishing point of the virtual image coincides with the vanishing point of the lane. This configuration allows preventing or reducing the uncomfortable feeling of the viewer that visually recognizes the object and virtual image at the same time.

A device according to a comparative example, in which the vanishing point of the virtual image coincides with the vanishing point of the lane, has difficulty in having the orientation of the outer line on one side with respect to the virtual image in the lateral direction approximate the orientation of the outer line of the lane on the same side as the one side with respect to the virtual image, except for, e.g., the case in which the width of the virtual image coincides with the width of the lane to display the virtual image. That is, the device according to the comparative example has room for improvement in preventing or reducing the uncomfortable feeling of a viewer that visually recognizes the object and the virtual image at the same time.

The HUD 100 preferably includes an image forming unit and a concave mirror 40 (a light guide). The image forming unit forms an image with light such that the vanishing point of the virtual image is displaced from the vanishing point of the lane. The concave mirror 40 guides the light forming the image to the 50.

In at least one embodiment, the HUD 100 further includes a virtual-image vanishing point setting unit 904 (a setting unit) to set the position of the vanishing point of the virtual image according to the position of the vanishing point of the lane. This configuration allows automatically setting the position of the vanishing point of the virtual image according to the position of the vanishing point of the lane at all times.

Further, in at least one embodiment, the HUD 100 sets the position of the vanishing point of the virtual image based on an image of the lane captured by an imaging device (for example, the camera 400). Note that setting the position of the vanishing point of the virtual image is achieved by using data of the lane preliminarily obtained, without the image captured by the imaging device.

In at least one embodiment, the vanishing point of the virtual image is displaced from the vanishing point of the lane in at least a lateral direction of the vehicle.

In some embodiments, the vanishing point of the virtual image is displaced from the vanishing point of the lane in at least a vertical direction of the vehicle.

In at least one embodiment, the vanishing point of the virtual image is set at a position to obtain a smaller slant angle of the first outer line to the second outer line than the case in which the vanishing point of the virtual image coincides with the vanishing point of the lane as viewed from the windshield 50. The first outer line is one of two outer lines defining the lane, on one side with respect to the lane in the lateral direction of the vehicle. The second outer line is one of two outer lines of the virtual image, on the same side as the one side with respect to the lane. The two outer lines defining the lane include white lines defining the lane as well as the borderlines between the lane and the sidewalks.

In at least one embodiment, the vanishing point of the virtual image is set at a position to obtain the first outer line substantially parallel with the second outer line as viewed from the windshield 50. This configuration prevents or reduces the uncomfortable feeling of the driver (the viewer) as much as possible.

In at least one embodiment, the center of the display area is displaced from the center of the vehicle in at least a lateral direction of the vehicle. The above-described one side with respect to the lane is a side to which the center of the display area is displaced from the center of the vehicle. This configuration reliably prevents the uncomfortable feeling of the driver (the viewer).

In at least one embodiment, the vanishing point of the virtual image is set at an intersection of the horizontal line and the straight line that passes through the center point of the lower edge of the display area and the point at which the center line of the lane overlaps the upper edge of the display area.

In at least one embodiment, the periphery of the virtual image is an n-sided polygon (n is greater than or equal to 3).

Note that, the virtual image is not limited to the inter-vehicle indication. In some embodiments, the virtual image is, for example, a guide indication regarding a planned route of the vehicle (for example, an indication regarding a next curve point of the vehicle or an indication regarding shops, facilities, and houses near the planned route). In some other embodiments, the virtual image is an indicator to indicate other vehicles (for example, an arrow). Displaying the above-described guide indication is achieved by obtaining information regarding the planned route of the vehicle (for example, an indication regarding a next curve point of the vehicle or an indication regarding shops, facilities, and houses near the planned route) from a device (e.g., a car navigation system) that obtains the positional information of the vehicle. The orientation of the above-described indicator is set based on the position of another vehicle (for example, a preceding vehicle) detected by a LiDAR or a camera.

In at least one embodiment, the HUD 100 receives a distance between a preceding vehicle and the host vehicle from a vehicle controller 300 (a device), and displays a virtual image including an indication that indicates the distance (inter-vehicle distance) between the preceding vehicle and the host vehicle.

In at least one embodiment, the indication (inter-vehicle distance indication) that indicates the inter-vehicle distance extends in a width direction of the lane, in which the vehicle is traveling, and includes a plurality of structural units arranged in a length direction of the lane. This configuration allows the driver (the viewer) to understand the inter-vehicle distance with first view.

In at least one embodiment, the plurality of structural units is subsequently displayed one by one from the lower edge up to the upper edge of the display area when switching the inter-vehicle distance indication from non-display to display. This configuration allows notifying the driver (the viewer) of appearance of a preceding vehicle.

In at least one embodiment, the vehicle controller 300 sets a target value of the inter-vehicle distance based on a relative speed between the host vehicle and the preceding vehicle. Further, the HUD 100 obtains the target value of the inter-vehicle distance from the vehicle controller 300, and displays a virtual image that further indicates the target value of the inter-vehicle distance.

In at least one embodiment, the vehicle controller 300 outputs an instruction for displaying a virtual image to the HUD 100 when a preceding vehicle is detected. The HUD 100 displays a virtual image with a current (updated) target value of inter-vehicle distance obtained from the vehicle controller 300, in response to the reception of the instruction of the vehicle controller 300.

A vehicle device (a mobile device) including the HUD 100 and a vehicle mounted with the HUD 100 provides information regarding an operation of the vehicle (for example, an inter-vehicle distance indication and target value of the inter-vehicle distance) while preventing or reducing the uncomfortable feeling of the driver.

A display method according to embodiments of the present disclosure is a method for displaying a virtual image formed by light illuminating the windshield 50 (a transmission and reflection member) mounted on a vehicle (a mobile object), within a display area such that the virtual image overlaps a lane (an object other than the mobile object) in which the vehicle is traveling. The display method includes forming an (virtual) image with light to have a vanishing point of the virtual image displaced from a vanishing point of the lane, and guiding the light forming the image to the windshield 50.

This configuration allows the orientation of the outer line of the virtual image on a side with respect to the virtual image in the lateral (horizontal) direction to approximate the orientation of the outer line of the lane on the same side as the side with respect to the virtual image, as compared to the case in which the vanishing point of the virtual image coincides with the vanishing point of the lane. As a result, the uncomfortable feeling of the viewer that visually recognizes the object and virtual image at the same time is reduced or prevented.

In the above-describing forming, an image is formed to obtain a smaller slant angle of the first outer line to the second outer line than the case in which the vanishing point of the virtual image coincides with the vanishing point of the lane as viewed from the windshield 50. The first outer line is one of two outer lines defining the lane, on one side with respect to the lane in the lateral direction of the vehicle. The second outer line is one of two outer lines of the virtual image, on the same side as the one side with respect to the lane.

In at least one embodiment, the display method further includes setting the display area at a position to have the center of the display area displaced from the center of the vehicle in at least a lateral direction of the vehicle, prior to the above-describing forming. The above-described one side with respect to the lane is a side to which the center of the display area is displaced from the center of the lane.

In at least one embodiment, the display method further includes capturing an image of the lane prior to the above-describing forming. Accordingly, an image is formed based on a capture result (captured image) of the capturing, in the above-described forming.

In FIGS. 15 and 17, the configuration that displays the inter-vehicle distance and the target value of the inter-vehicle distance is adopted. In some embodiments, for example, the configuration that display only the inter-vehicle distance is adopted.

In the HUD according to the above-described embodiments and variations, the light guide is the concave mirror 40. However, the present disclosure is not limited thereto. In some embodiments, the light guide is, e.g., a convex mirror, or includes a curved mirror (a concave mirror or a convex mirror) and a reflecting mirror disposed between the curved mirror and the screen 30.

In the above-described embodiments and variations, the optical scanning device includes the scanning mirror 20, but may not include the scanning mirror 20.

In the above-described embodiments and variations, a laser diodes (LD), such as an end-surface emitting laser, is used as the light-source device 11. Alternatively, other types of light source, such as vertical-cavity surface-emitting lasers (VCSEL), may be used.

In the above-described embodiments and variations, the HUD 100 is compatible with a color image. However, the HUD 100 is compatible with a monochrome image.

Moreover, the transmission and reflection member is not limited to a front windshield (front window) of a vehicle, and may be, for example, a side windshield or a rear windshield. That is, the transmission and reflection member is preferably a window member (windshield) that is mounted on a vehicle for a viewer to visually identify the outside of the vehicle.

In the above-described embodiments and variations, cases in which the HUD 100 is mounted on a vehicle are described. However, no limitation is indicated thereby, and variations may be made as long as the HUD 100 is mounted on a mobile object such as a vehicle, an airplane, or a ship. For example, the vehicle used in a mobile device according to the present disclosure is not limited to a four-wheeled vehicle, and may be a motorcycle or an auto tricycle. In this case, a windshield or a combiner is preferably mounted on a vehicle as the transmission and reflection member. Examples of a power source of a vehicle include, for example, an engine, a motor, and the combination thereof.

In the above-described embodiments and variation, a "target", on which the virtual image is overlapped and displayed, is a lane in which the vehicle is traveling. However, no limitation is intended therein. Such a target is anything viewable (for example, something linear) that is used as a guideline for a viewer of the virtual image to move a mobile object. Examples of such a target include a border line between objects outside the mobile object, a border line between an object and the space outside the mobile object, and a protrusion or a recess (a groove) formed on an object outside the mobile object.

Further, the specific numerical values and shapes in the above-described embodiments, variations, and examples are merely one example and are appropriately modified without departing from the spirit of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A display device mountable on a mobile object, the display device comprising:
    an image forming unit to form an image with light;
    a light guide to guide the light forming the image to a transmission and reflection member to cause a virtual image of the image be displayed within a display area, the virtual image overlapping an object outside the mobile object; and
    circuitry configured to set a vanishing point of a display object included in the virtual image, such that the vanishing point of the display object included in the displayed virtual image is displaced from a vanishing point of the object,
    wherein the circuitry is further configured to set a position of the vanishing point of the display object in the virtual image based on a direction of an outer line defining the object, as determined from a captured image of the object captured by an imaging device, and set a shape of the display object based on the set vanishing point of the display object.

2. The display device according to claim 1,
    wherein the vanishing point of the display object in the virtual image is set by the circuitry so as to be displaced from the vanishing point of the object in at least a lateral direction of the mobile object.

3. The display device according to claim 1,
    wherein the vanishing point of the display object in the virtual image is set by the circuitry so as to be displaced from the vanishing point of the object in at least a vertical direction of the mobile object.

4. The display device according to claim 1,
    wherein the circuitry is further configured to set the position of the vanishing point of the display object in the virtual image to obtain a smaller slant angle of a first outer line to a second outer line than when the vanishing point of the display object in the virtual image coincides with the vanishing point of the object as viewed from the transmission and reflection member, and
    wherein the first outer line is one of two outer lines defining the object, on one side with respect to the object in the lateral direction of the mobile object, and the second outer line is one of two outer lines of the virtual image, on a same side as the one side with respect to the object.

5. The display device according to claim 4,
    wherein the circuitry is further configured to set the position of the vanishing point of the display object in the virtual image to have the first outer line that is substantially parallel with the second outer line as viewed from the transmission and reflection member.

6. The display device according to claim 4,
    wherein a center of the display area is displaced from a center of the mobile object in at least the lateral direction of the mobile object, and
    wherein the one side with respect to the object in the lateral direction of the mobile object is a side to which the center of the display area is displaced from the center of the mobile object.

7. The display device according to claim 1,
    wherein the circuitry is further configured to set the vanishing point of the display object in the virtual image at an intersection of a horizontal line of the mobile object and a straight line passing through a center point of a lower edge of the display area and a point at which a center line of the object overlaps an upper edge of the display area.

8. The display device according to claim 1,
    wherein the mobile object is a vehicle, and the object is a lane in which the vehicle is traveling, and
    wherein the circuitry is further configured to cause display of the virtual image including the display object, which includes an indication representing a distance between the vehicle and a preceding vehicle of the vehicle, the distance being output from a device that obtains the distance.

9. The display device according to claim 8,
    wherein the indication of the distance extends in a width direction of the lane and includes a plurality of structural units disposed in a length direction of the lane.

10. The display device according to claim 9,
    wherein the circuitry is further configured to subsequently cause display of the plurality of structural units one by one from a lower edge to an upper edge of the display area when switching the indication from non-display to display.

11. The display device according to claim 1,
    wherein the circuitry is further configured to obtain a target value of the distance between the vehicle and the preceding vehicle of the vehicle, from the device that sets the target value based on a relative speed of the vehicle and the preceding vehicle, and cause display of the virtual image that indicates the target value.

12. The display device according to claim 11,
    wherein the circuitry is further configured to cause display of the virtual image with an updated target value obtained from the device, in response to a receipt of an instruction for displaying the virtual image from the device when the device detects the preceding vehicle.

13. The display device of claim 1, wherein the circuitry is further configured to set the position of the vanishing point of the display object in the virtual image by setting outer lines defining a lateral extent of the display object in the virtual image.

14. A mobile-object apparatus comprising;
the display device according to claim 1; and
a mobile object mounted with the display device.

15. A display method performed by a display device mountable on a mobile object, the method comprising:
forming an image with light;
guiding the light forming the image to a transmission and reflection member mounted on the mobile object to cause a virtual image of the image be displayed within a display area, the virtual image overlapping an object outside the mobile object; and
setting a vanishing point of a display object included in the virtual image such that the vanishing point of the display object included in the displayed virtual image is displaced from a vanishing point of the object,
wherein the setting step includes setting a position of the vanishing point of the display object in the virtual image based on a direction of an outer line defining the object, as determined from a captured image of the object captured by an imaging device, and setting a shape of the display object based on the set vanishing point of the display object.

16. The display method according to claim 15,
wherein, in the forming step, a slant angle of a first outer line to a second outer line is smaller than when the vanishing point of the display object of the virtual image coincides with the vanishing point of the object as viewed from the transmission and reflection member, and
wherein the first outer line is one of two outer lines defining the object, on one side with respect to the object in a lateral direction of the mobile object, and the second outer line is one of two outer lines of the virtual image, on a same side as the one side with respect to the object.

17. The display method according to claim 15, further comprising setting the display area to have a center of the display area displaced from a center of the mobile object in at least lateral direction of the mobile object, before the forming an image,
wherein the one side is a side to which the center of the display are is displaced from the center of the mobile object.

18. A non-transitory recording medium storing a program for causing a computer to execute a method of displaying comprising:
setting a vanishing point of a display object included in a virtual image;
forming an image, which is the virtual image, with light to have the vanishing point of the display object of the virtual image displaced from a vanishing point of an object, on which the virtual image is overlapped and displayed, within a display area outside a mobile object; and
guiding the light forming the image to a transmission and reflection member mounted on the mobile object to display the virtual image within the display area while overlapping the object,
wherein the setting step includes setting a position of the vanishing point of the display object in the virtual image based on a direction of an outer line defining the object, as determined from a captured image of the object captured by an imaging device, and setting a shape of the display object based on the set vanishing point of the display object.

\* \* \* \* \*